(12) United States Patent
Cherukara et al.

(10) Patent No.: US 11,895,269 B2
(45) Date of Patent: Feb. 6, 2024

(54) DETERMINATION AND VISUAL DISPLAY OF SPOKEN MENUS FOR CALLS

(71) Applicant: Google LLC, Mountain View, CA (US)

(72) Inventors: Joseph Joseph Cherukara, San Francisco, CA (US); Amit Sivan, Tel Aviv (IL); Andrew George Shebanow, San Jose, CA (US); Yoav Tzur, Tel Aviv (IL); Felix Wang, New York, NY (US); Yaniv Leviathan, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 165 days.

(21) Appl. No.: 17/540,895

(22) Filed: Dec. 2, 2021

(65) Prior Publication Data

US 2023/0066100 A1    Mar. 2, 2023

Related U.S. Application Data

(60) Provisional application No. 63/236,651, filed on Aug. 24, 2021.

(51) Int. Cl.
*H04M 3/493* (2006.01)
*H04M 1/72469* (2021.01)
(Continued)

(52) U.S. Cl.
CPC ........... *H04M 3/4936* (2013.01); *G10L 15/22* (2013.01); *G10L 15/26* (2013.01);
(Continued)

(58) Field of Classification Search
CPC ........... H04M 3/4936; H04M 1/72469; H04M 3/42059; H04M 2201/40; H04M 2201/42;
(Continued)

(56) References Cited

U.S. PATENT DOCUMENTS 4,880,026 A * 11/1989 Ferre .......................... B60S 3/04
52/79.5
5,199,062 A * 3/1993 Von Meister ......... H04M 3/493
379/212.01
(Continued)

FOREIGN PATENT DOCUMENTS

EP         3295457 A1    3/2018
WO    2016183256 A1    11/2016

OTHER PUBLICATIONS

International Search Report and Written Opinion of International Application No. PCT/US2022/037550 dated Nov. 14, 2022, 10 pp.
(Continued)

*Primary Examiner* — Lisa Hashem
(74) *Attorney, Agent, or Firm* — Shumaker & Sieffert, P.A.

(57) ABSTRACT

Implementations relate to determination and visual display of spoken menus for calls. In some implementations, a computer-implemented method includes receiving audio data output in a call between a call device and a device associated with a target entity. The audio data includes speech indicating one or more selection options for a user of the call device to navigate through a call menu provided by the target entity in the call. Text is determined by programmatically analyzing the audio data, the text representing the speech. The selection options are determined based on programmatically analyzing at least one of the text or the audio data. At least a portion of the text is displayed by the call device during the call, as one or more visual options that correspond to the selection options. The visual options are each selectable via user input to cause corresponding navigation through the call menu.

19 Claims, 10 Drawing Sheets

(51) Int. Cl.
  *H04M 3/42* (2006.01)
  *G10L 15/26* (2006.01)
  *G10L 15/22* (2006.01)
(52) U.S. Cl.
  CPC ... *H04M 1/72469* (2021.01); *H04M 3/42059* (2013.01); *G10L 2015/223* (2013.01); *G10L 2015/225* (2013.01); *H04M 2201/40* (2013.01); *H04M 2201/42* (2013.01); *H04M 2203/2038* (2013.01); *H04M 2203/551* (2013.01)
(58) Field of Classification Search
  CPC ... H04M 2203/2038; H04M 2203/551; H04M 2203/252; H04M 2250/74; G10L 15/22; G10L 15/26; G10L 2015/223; G10L 2015/225
  See application file for complete search history.

(56) References Cited

U.S. PATENT DOCUMENTS

| | | | | |
|---|---|---|---|---|
| 6,167,255 | A * | 12/2000 | Kennedy, III | H04W 8/183 455/445 |
| 8,625,756 | B1 | 1/2014 | Lavian et al. | |
| 9,426,289 | B2 * | 8/2016 | Shaffer | G06Q 50/01 |
| 9,430,186 | B2 * | 8/2016 | Faaborg | G10L 15/00 |
| 9,723,147 | B1 * | 8/2017 | Kammeyer | H04M 7/0012 |
| 9,832,308 | B1 | 11/2017 | Rogers et al. | |
| 10,277,478 | B2 * | 4/2019 | Stoops | H04L 41/5061 |
| 10,579,330 | B2 * | 3/2020 | Koul | H04M 3/493 |
| 10,659,501 | B2 * | 5/2020 | Klemm | H04L 65/1069 |
| 10,810,997 | B2 * | 10/2020 | Yeracaris | G10L 15/063 |
| 10,938,987 | B2 * | 3/2021 | Lin | H04L 65/4015 |
| 11,128,752 | B2 * | 9/2021 | Deole | H04M 3/5191 |
| 11,418,647 | B1 * | 8/2022 | Peterson | H04M 3/5175 |

OTHER PUBLICATIONS

Krasnoff, "How to use Google's free transcription tools", The Verge; retrieved from Internet: https://www.theverge.com/21368867/transcription-google-docs-live-transcribe-how-to-zoom, Aug. 14, 2020, 3 pages.

Rayome, "How Google is turning its Cloud Speech-to-Text AI into a real business tool", The Verge; retrieved from Internet: https://www.techrepublic.com/article/how-google-is-turning-its-cloud-speech-to-text-ai-into-a-real-business-tool/, Apr. 10, 2018, 3 pages.

* cited by examiner

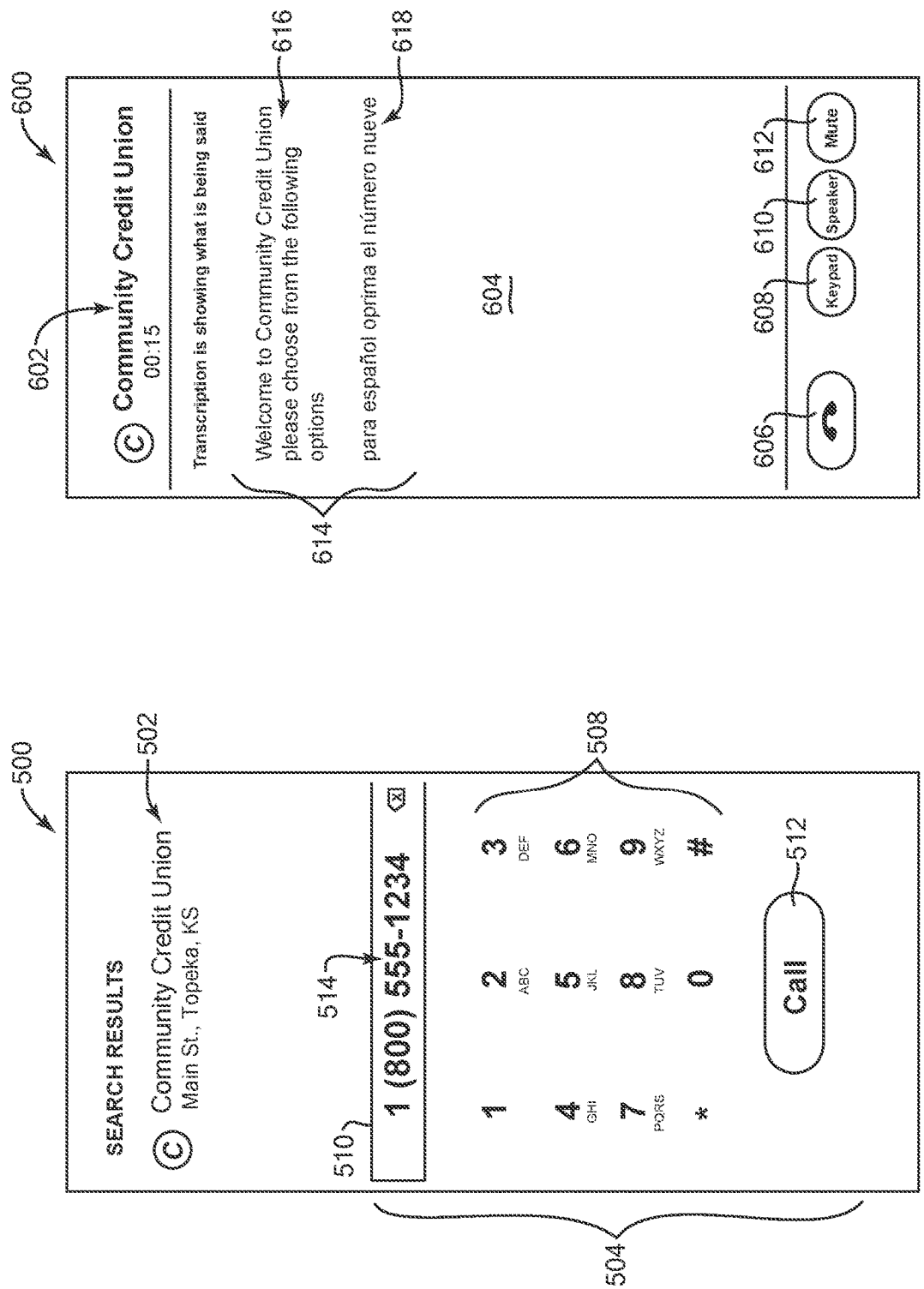

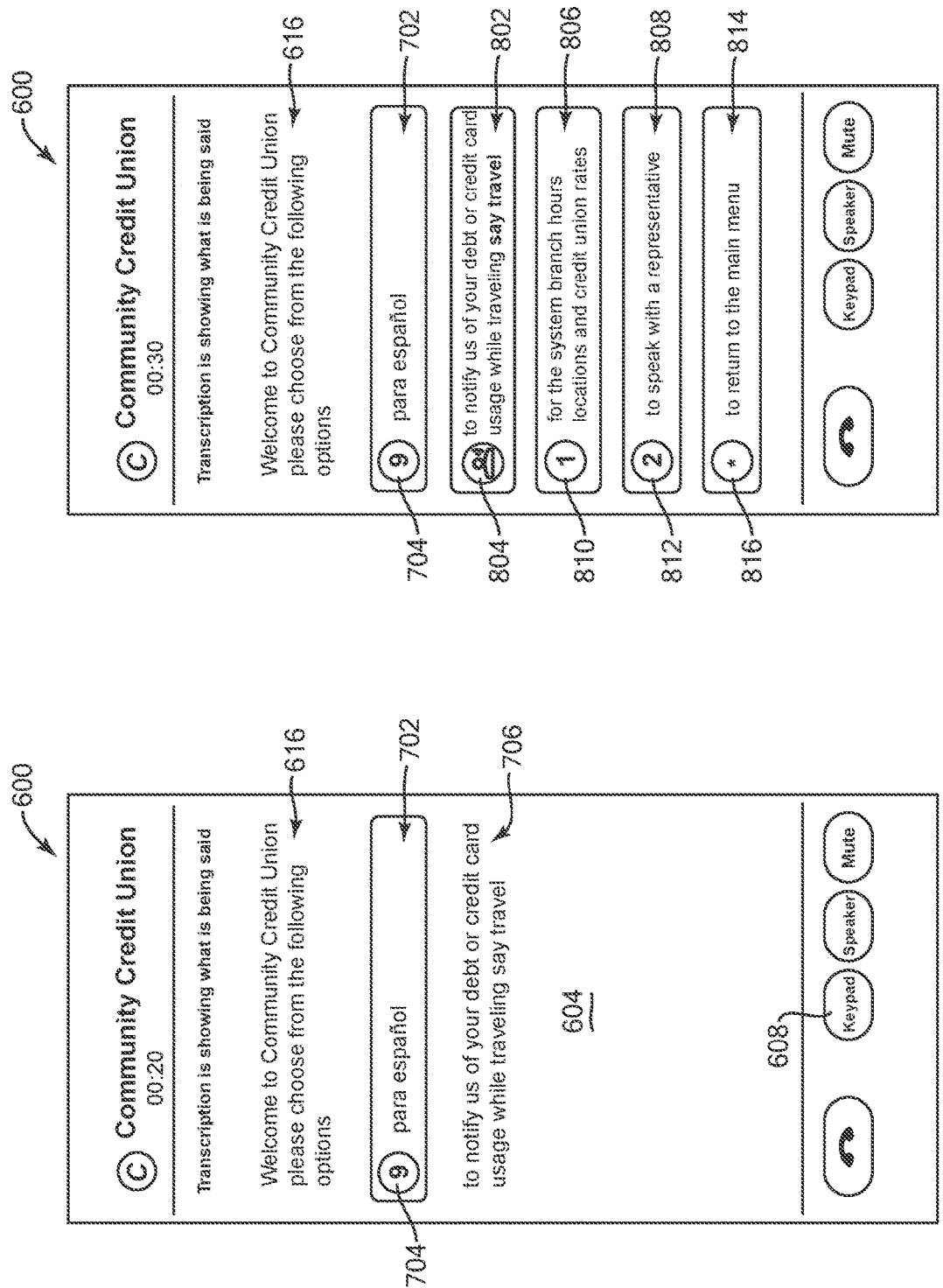

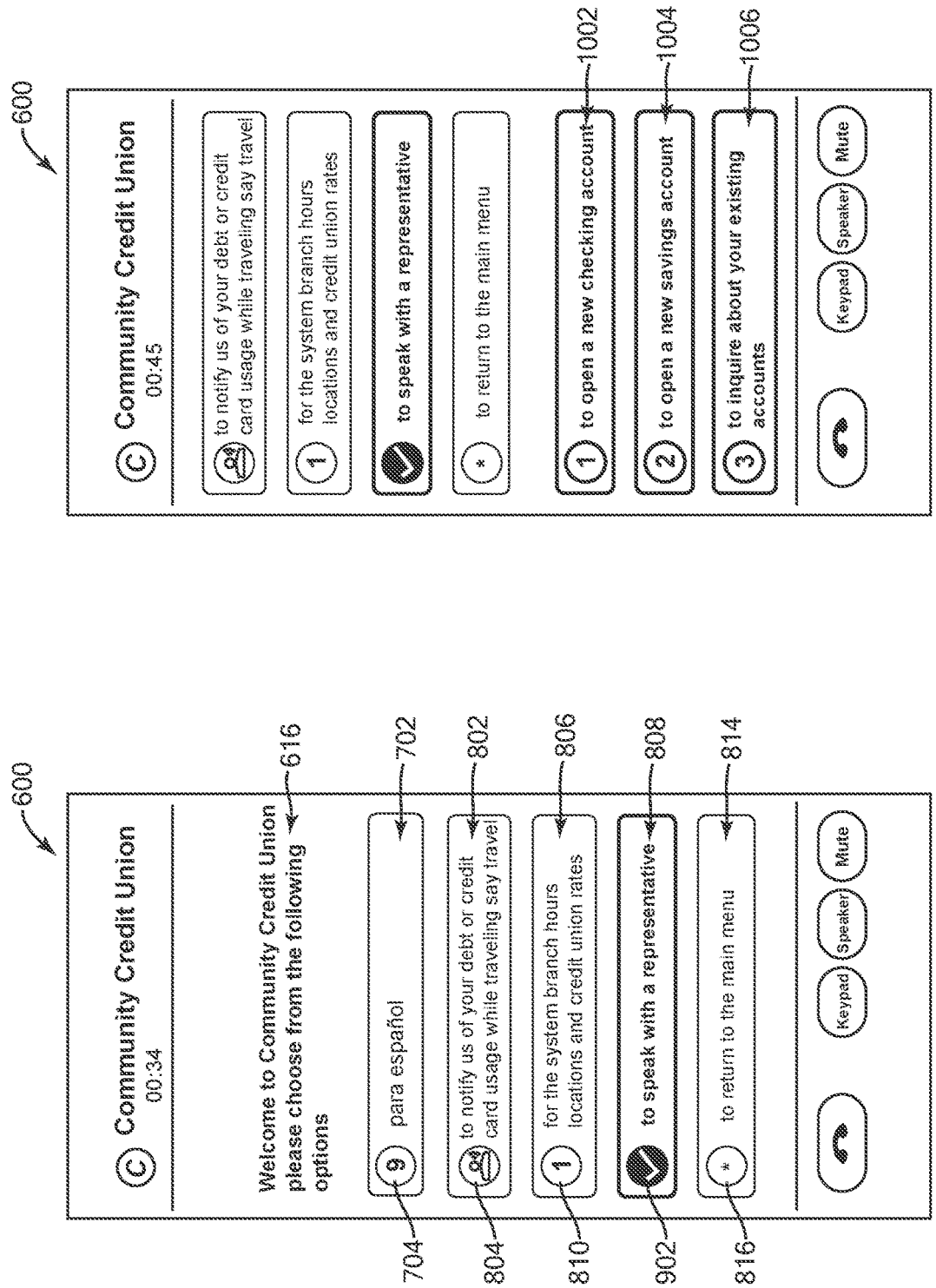

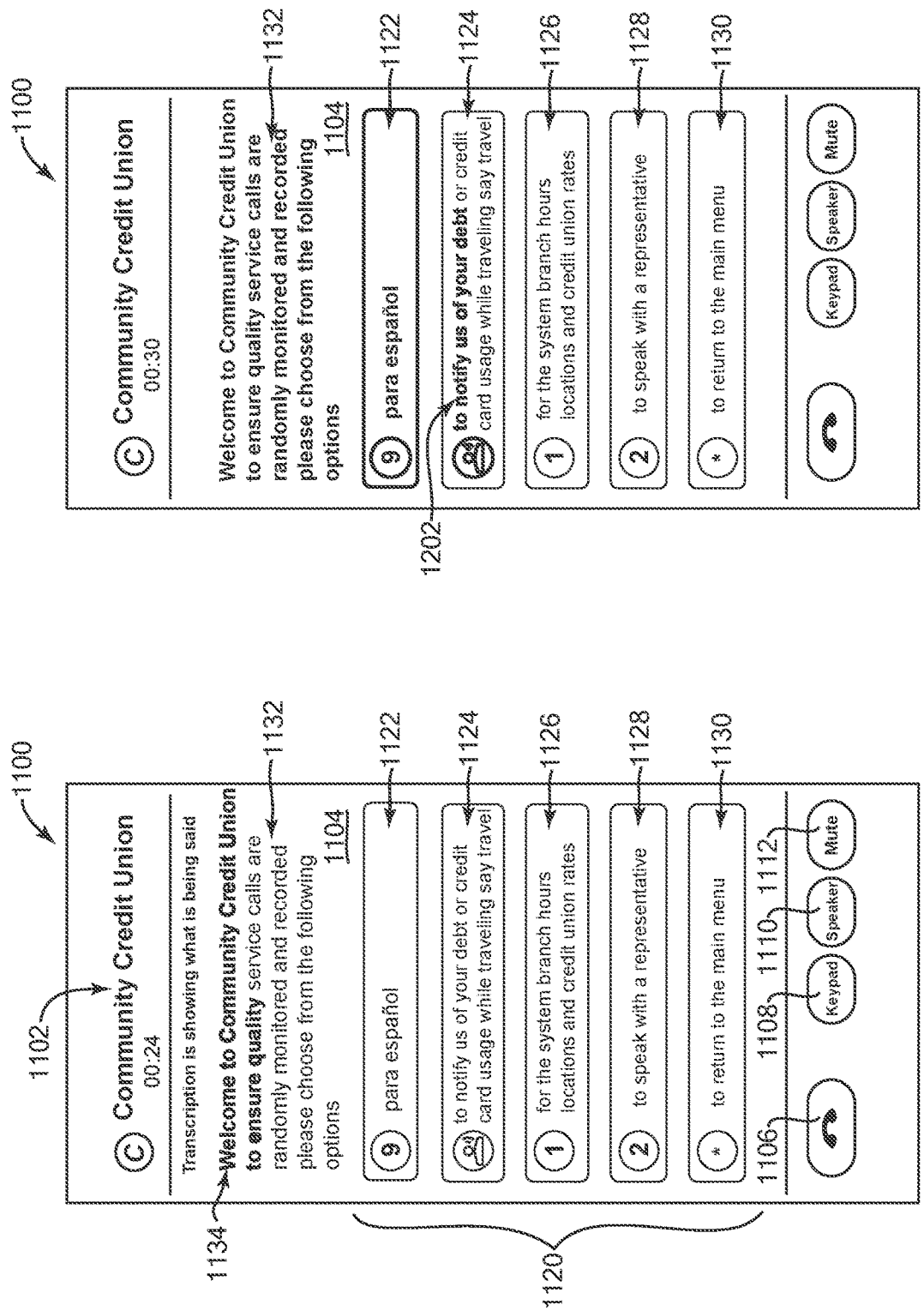

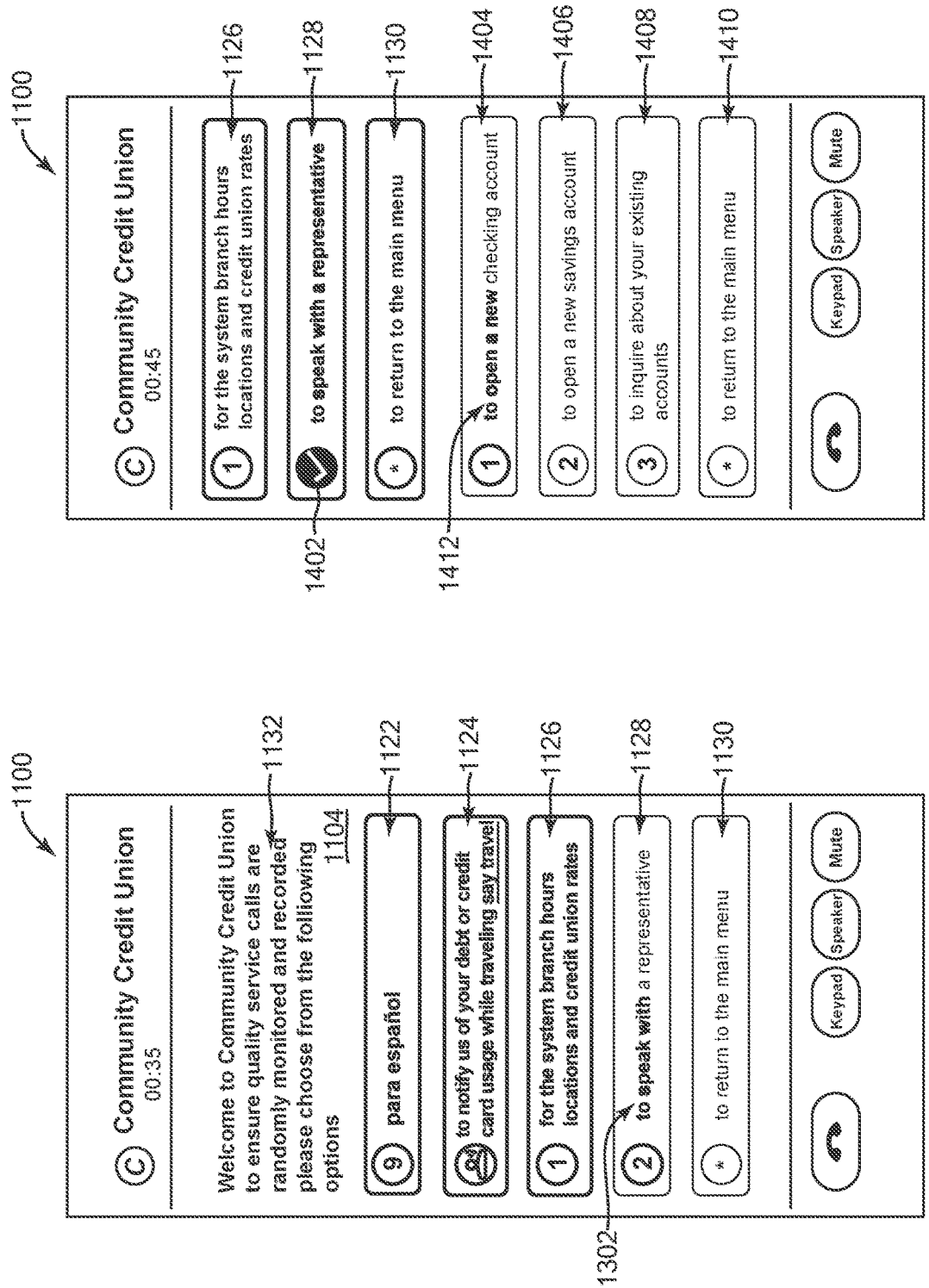

DETERMINATION AND VISUAL DISPLAY OF SPOKEN MENUS FOR CALLS

CROSS-REFERENCE TO RELATED APPLICATIONS

This application claims priority to U.S. Provisional Patent Application No. 63/236,651, entitled, "Determination and Visual Display of Spoken Menus for Calls," filed Aug. 24, 2021, which is incorporated herein by reference in its entirety.

BACKGROUND

Many businesses and other organizations provide automated telephone menus for callers that call the business, also known as interactive voice response (IVR). Typically, a caller that calls the business receives an automated voice that describes, in spoken words, a menu of several options from which the caller can select. Often a hierarchy of sets of such options is presented, allowing the caller to navigate through the options to a desired result. For example, the caller may desire to receive particular information, request a product or service of the business, talk to a human agent, etc. The caller can select an option in the call menu by speaking a number, a word, or a phrase, or pressing a key that is associated with the option, which is detected and recognized by the automated system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to determination and visual display of spoken menus for calls. In some implementations, a computer-implemented method includes receiving audio data output in a call between a call device and a device associated with a target entity. The audio data includes speech indicating one or more selection options for a user of the call device to navigate through a call menu provided by the target entity in the call. Text is determined by programmatically analyzing the audio data, where the text represents the speech in the audio data. The selection options are determined based on programmatically analyzing at least one of the text or the audio data. At least a portion of the text is caused to be displayed by the call device during the call, the text being displayed as one or more visual options that correspond to the selection options. The visual options are each selectable via user input to cause corresponding navigation through the call menu.

Various implementations and examples of the method are described. For example, in some implementations, the method further includes, in response to receiving a selection of a particular visual option of the one or more visual options, causing an indication of the selection to be sent to the device associated with the target entity, where the indication is a signal corresponding to a press of a key of a keypad, the key being associated with the particular visual option, or speech provided by the call device in the call, the speech comprising a designator associated with the particular visual option. In some implementations, the one or more visual options are each selectable via touch input on a touchscreen of the call device.

In some implementations, the audio data is first audio data, and in response to receiving a selection of a particular visual option, the method further includes receiving second audio data in the call, the second audio data including second speech indicating one or more second selection options, programmatically analyzing the second audio data to determine second text representing the second speech in the second audio data, determining the one or more second selection options based on programmatically analyzing at least one of the second text or the second audio data, and causing at least a portion of the second text to be displayed by the call device as one or more second visual options corresponding to the second selection options, the one or more second visual options each being selectable via second user input to cause corresponding navigation through the call menu. In some implementations, the one or more selection options are a plurality of selection options, and the method further includes programmatically analyzing at least one of the text or the audio data to determine a hierarchical structure of the plurality of selection options in the call menu. In some implementations, the method further includes causing the one or more selection options to be stored in storage of the call device and/or storage of a remote device that communicates with the call device over a communication network, and retrieving the one or more selection options for a next call between the call device and the target entity.

In some implementations, the method further includes, before receiving the audio data, obtaining selection option data including the one or more selection options, and causing the one or more visual options corresponding to the one or more selection options to be displayed by the call device before the call device receives the audio data that includes the speech indicating the one or more selection options. In some examples, the selection options in the selection option data are determined by programmatically analyzing audio data received during previous calls. For example, in some implementations, the obtained selection option data is cached in the call device prior to initiation of the call, the obtained selection option data being associated with entity identifiers that have been previously called by callers in a geographic area of the call device, and associated with entity identifiers that have been previously called at least a threshold number of times or have been previously called a higher number of times than other entity identifiers that are not associated with the obtained selection option data.

In some implementations, a visual indicator is caused to be displayed during the call, the visual indicator highlighting a particular portion of the text of the visual options displayed during the call, the particular portion of text currently being received during the call in the speech in the audio data. In some implementations, the method further includes comparing the selection option data with the one or more selection options determined from the audio data, and determining whether a mismatch exists between the selection option data and the one or more selection options determined from the audio data. In various implementations, the method further includes, in response to determining the mismatch, causing a notification of the mismatch to be output by the call device and/or modifying the selection option data to match the one or more selection options determined from the audio data. In some implementations, comparing the selection option data with the one or more selection options includes comparing text of the selection option data with the text of the one or more selection options, and/or comparing audio data of the selection option data with the audio data received during the call.

In some implementations, a call device to display selection options for calls includes a memory storing instructions, a display device, and at least one processor coupled to the memory, the at least one processor configured to access the instructions from the memory to perform operations. The operations include receiving audio data in a call between the call device and a device associated with a target entity, the audio data including speech indicating one or more selection options for a user of the call device to navigate through a call menu provided by the target entity in the call; programmatically analyzing the audio data to determine text representing the speech in the audio data; determining the one or more selection options based on programmatically analyzing at least one of the text or the audio data; and causing at least a portion of the text to be displayed by the display device during the call, the portion of the text being displayed as one or more visual options corresponding to the one or more selection options, and the one or more visual options each being selectable via user input to cause corresponding navigation through the call menu.

In various implementations of the call device, the processor performs further operations including, in response to receiving a selection of a particular visual option of the one or more visual options, causing an indication of the selection to be sent to the device associated with the target entity, wherein the indication is a signal corresponding to a press of a key of a keypad, the key associated with the particular visual option, or speech provided by the call device in the call, the speech comprising a designator associated with the particular visual option. In some implementations, the processor performs further operations including, before receiving the audio data, obtaining selection option data including the one or more selection options and a hierarchical structure of the one or more selection options in the call menu, and causing the one or more visual options corresponding to the one or more selection options to be displayed by the display device before the call device receives the audio data that includes the speech indicating the one or more selection options.

In some implementations, the processor performs further operations including causing a visual indicator to be displayed during the call, the visual indicator highlighting a particular portion of the text of the one or more visual options displayed during the call, the particular portion of text currently being spoken during the call in the speech in the audio data. In some implementations, the processor performs further operations including comparing the selection option data with the one or more selection options determined from the audio data, and determining whether a mismatch exists between the selection option data and the one or more selection options determined from the audio data. In various implementations, operations performed by the processor can include one or more features of the method above.

In some implementations, a non-transitory computer readable medium having stored thereon instructions that, when executed by a processor, cause the processor to perform operations. The operations include receiving audio data in a call between a call device and a device associated with a target entity, the audio data including speech indicating one or more selection options for a user of the call device to navigate through a call menu provided by the target entity; programmatically analyzing the audio data to determine text representing the speech in the audio data; determining the one or more selection options based on programmatically analyzing at least one of the text or the audio data; and causing at least a portion of the text to be displayed by the call device during the call, the portion of the text being displayed as one or more visual options corresponding to the one or more selection options, and the one or more visual options each being selectable via user input to cause corresponding navigation through the call menu. In various implementations, operations performed by the processor can include one or more features of the method or call device above.

BRIEF DESCRIPTION OF THE DRAWINGS

FIG. 5 are diagrammatic illustrations of a user interface displayed by a call device in which a call can be initiated, according to some implementations;

FIGS. 6-10 are diagrammatic illustrations of a user interface displayed by a call device in which selection options for a call menu in a call are displayed, and selected, according to some implementations;

FIGS. 11-14 are diagrammatic illustrations of a user interface displayed by a call device in which visual options of a call menu are displayed prior to corresponding selection options being spoken in a call, according to some implementations.

DETAILED DESCRIPTION

Figure 1:
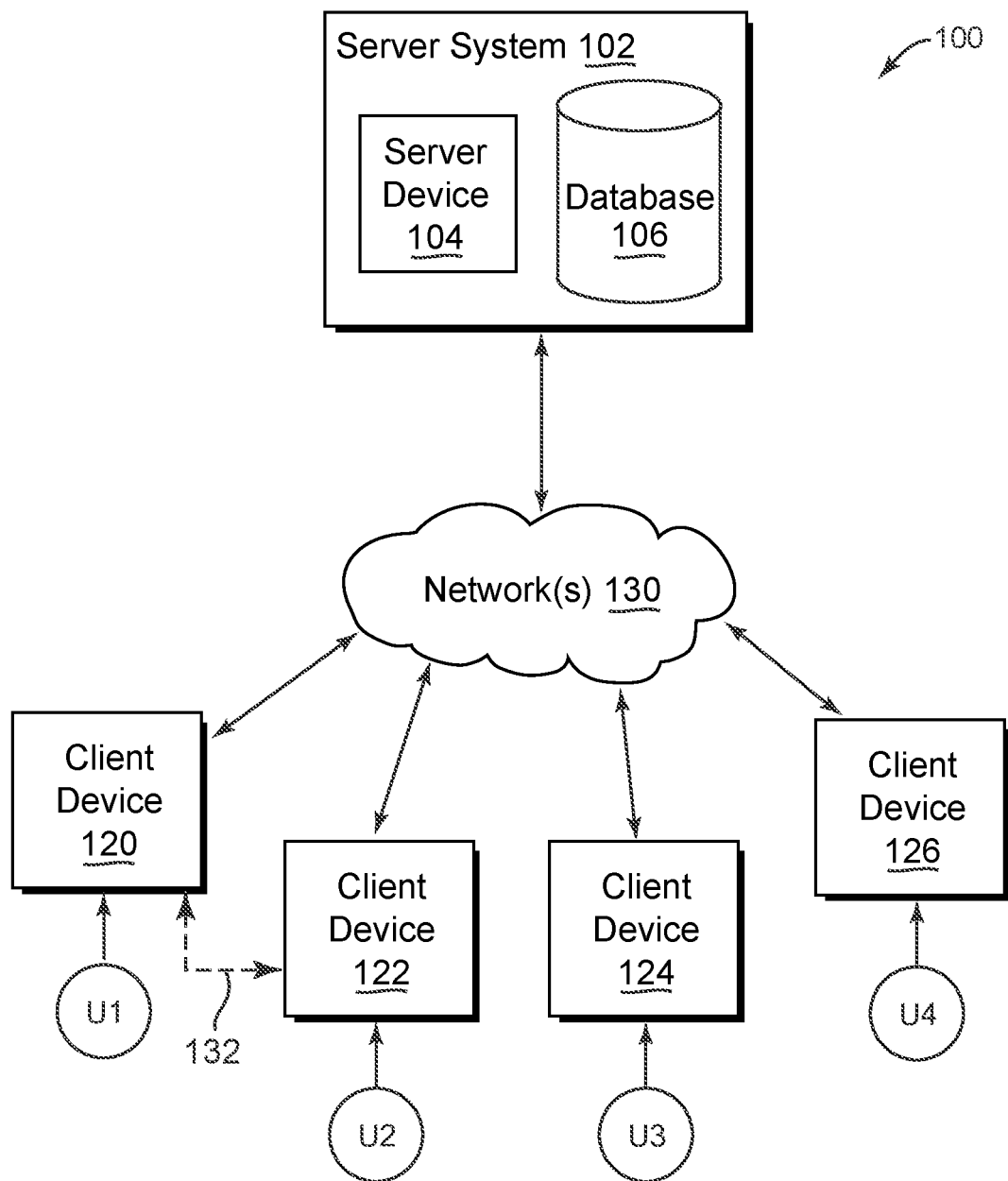
FIG. 1 is a block diagram of an example system which may be used for one or more implementations described herein.

One or more implementations described herein relate to determination and visual display of spoken menus for calls. In various implementations, audio data that includes speech is obtained from a call between a call device of a user and a target entity (e.g., a person or business). The target entity can use an automated voice system (e.g., using interactive voice response or IVR, or an answering machine) or a human agent. The speech includes selection options in a call menu that the user can navigate through to obtain a desired result (receive information, speak to a human agent, etc.). Text is recognized from the call audio data, which represents the speech describing the selection options. The selection options are detected based on analyzing the text and/or the audio data. At least a portion of the text is displayed by the call device during the call, as visual options that correspond to the selection options. The visual options are each selectable via user input to cause corresponding navigation through the call menu.

Various additional features are described. For example, in some implementations, a selection by the user of a particular visual option causes the selection to be sent to the target entity, which can be a signal corresponding to a press of an appropriate key of a keypad of the call device, or can be speech provided by the call device that selects the visual option. The audio data and/or text can be analyzed to determine a hierarchical structure of the selection options in the call menu.

In some implementations, selection option data is obtained by the call device prior to the call, e.g., received by the call device from a server or other remote device that stores selection option data for various entities. In some examples, selection option data may have been determined from the audio data of previous calls by call devices to the entities. The call device can download and cache selection option data for various entities and/or entity identifiers (e.g., phone numbers, email addresses, instant messaging or over-the-top (OTT) service identifiers, etc. of the entities) in advance of calls. In some examples, the cached selection option data can be for entity identifiers that have been more frequently called by users (e.g., called the most times in of a set of entity identifiers), or called at least a threshold number of times by users in a geographic area (or threshold distance) of the call device.

Using the cached selection options, corresponding visual options can be displayed prior to or during the call, before the selection options are spoken by the target entity in the call. Some implementations can compare the selection options spoken during the call to the cached selection option data, and if a mismatch is detected between these option versions, can notify the user of the mismatch and/or can modify the selection option data to match the selection options determined from the speech data of the current call. In some implementations, a visual indicator is displayed during the call, which highlights a particular portion of the text of the visual options that is currently being spoken during the call.

There are several advantages to described techniques and features. Described implementations can provide a visual representation of an audio call menu during a call. This can greatly assist a user in navigating a call menu, since audio call menus are often long, and impose significant cognitive load of the user to listen through the long audio messages to find an option that they need. Presenting a corresponding visual version of the call menu on a call device can greatly assist the user in determining which options are being presented and which of the options are of interest to the user. Furthermore, the displayed visual options are directly actionable and selectable by the user, such that the user can select a visual option using a simple selection of the option, e.g., via a touch on a touchscreen. Thus, a complicated audio experience is transformed to a simple visual experience by described features.

In addition, some implementations can present the options of the call menu in a visual form prior to these options being spoken by the target entity in the call. This allows the user to view the call menu in advance, and in some call menus, allows the user to select a menu option prior to that option being spoken to cause the target entity to immediately advance the call menu to another level without the user having to wait to hear remaining options spoken in the call. The visual form of the menu allows the user to scan ahead of the spoken portion of the menu, find the desired option, and select the option far more quickly than when hearing the options in audio form and then finding and selecting a desired option.

A technical effect of one or more described implementations is that devices expend fewer computational resources to obtain results. For example, a technical effect of described techniques is a reduction in the consumption of system processing resources and power resources as compared to prior systems that do not provide one or more of the described techniques or features. For example, such a prior system may require a user to spend significant time during a call hearing output of available options before determining which option best fits the user's needs. In some cases, in such prior systems, the user may forget which menu options were previously presented due to the length of the spoken option messages, and may have to replay the menu or call again to understand the available options, thus expending more time. Such long call times expend system resources wastefully. Features described herein can reduce such disadvantages by, e.g., displaying selection options for a call menu, allowing the user to view available call options and select desired options more quickly, reducing call durations and causing fewer calls to be initiated, thus lowering overall processing and power requirements of the call device, the target entity device, and other devices that communicate with the call device to enable calls.

Furthermore, in some implementations, visual call menu options are displayed in advance of those options being spoken in the call. A user can scan the visual options ahead of the corresponding spoken options, find a desired option, and select the option far more quickly than when the options are only in audio form. Such a feature reduces call durations and saves processing resources of the call device and entity device by allowing the user to navigate through call menus at a faster rate, including navigating quickly through call menus that the user has never heard or encountered before.

Furthermore, in some implementations, selection option data that provides selection options in advance of calls can be downloaded to and cached by a call device prior to initiation of calls, such that the consumption of processing and networking resources during a call may be reduced. Furthermore, in some implementations, spoken selection options can be detected during a call and compared to cached selection option data to determine whether displayed options may differ from spoken options, thus detecting errors or discrepancies that otherwise could waste processing and network resources of call devices when the user views and selects incorrect or undesired options. Furthermore, some implementations of described techniques can provide displayed selection options of a call menu prior to a call and/or prior to those options being spoken in the call based on data that is derived from previous calls by users and user call devices (e.g., client devices) to entities, without requiring selection option data to be directly received from the entities or associated entities that, e.g., may not be available.

Further to the descriptions herein, a user may be provided with controls allowing the user to make an election as to both if and when systems, programs, or features described herein may enable collection of user information (e.g., information about a user's call history specifying entities and entity identifiers called, social network, social actions, or activities, profession, a user's preferences including for call menus, a user's current location, a user's messages, outgoing calls placed by a user, audio data of a call, or a user's device), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 illustrates a block diagram of an example network environment 100, which may be used in some implementations described herein. In some implementations, network environment 100 includes one or more server devices, e.g., server system 102 in the example of FIG. 1. Server system 102 can communicate over a network 130, for example. Server system 102 can include a server device 104 and a database 106 or other storage device. Network environment 100 also includes one or more client devices, e.g., client devices 120, 122, 124, and 126, which may communicate with server 102, with each other, and/or with other devices via network connections 130. Network 130 can be any type of communication network, including one or more of the Internet, local area networks (LAN), wireless networks, switch or hub connections, etc. In some implementations, network 130 can include peer-to-peer communication between devices 120-126, e.g., using peer-to-peer wireless protocols (e.g., Bluetooth®, Wi-Fi Direct, etc.) or having one client device act as a server to the other client device, etc. One example of peer-to-peer communications between two client devices 120 and 122 is shown by arrow 132.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems, e.g., via the network 130. In some implementations, server system 102 can include cloud hosting servers or servers providing call services (e.g., Voice over Internet Protocol, VOIP), for example. In some examples, database 106 and/or other storage devices can be provided in server system block(s) that are separate from server device 104 and can communicate with server device 104 and other server systems via network 130. Also, there may be any number of client devices. In some examples, server system 102 wirelessly communicates with client devices over network connections 130, the client devices providing various features that can be enabled or supplemented by signals from the server mobile device.

Server system 102 and client devices 120-126 can be any types of devices used in a variety of applications, e.g., desktop computer, laptop computer, portable or mobile device, cell phone, smart phone, tablet computer, television, TV set top box or entertainment device, wearable devices (e.g., display glasses or goggles, head-mounted display (HMD), earpiece, earbuds, fitness band, wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, client devices 120-126 may interact with server system 102 via applications running on respective client devices and/or server system 102. For example, respective client devices 120, 122, 124, and 126 may communicate data to and from server system 102. In some implementations, server system 102 may send various data to all or particular devices of the client devices, such as content data (e.g., audio, images, video, messages, emails, etc.), notifications, commands, etc. Each client device can send appropriate data to the server system 102, e.g., acknowledgments, requests for data, notifications, user commands, call requests, etc. In some examples, the server and client devices can communicate various forms of data, including text data, audio data, video data, image data, or other types of data.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. In some implementations, the server system 102 may provide appropriate data to the client devices such that each client device can receive communicated content or shared content uploaded to the server system 102 and/or network service. In some implementations, a "user" can include one or more programs or virtual entities, as well as persons that interface with the system or network.

A user interface on a client device 120, 122, 124, and/or 126 can enable display of user content and other content, including images, video, data, and other content as well as communications (e.g., for phone or internet calls, videoconferencing, synchronous or asynchronous chat, etc.), privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Various applications and/or operating systems executing on the server and client devices can enable a variety of functions including communication applications (e.g., connecting and providing audio calls or voice calls, videoconferences, chats, or other communications), email applications, display of content data, privacy settings, notifications, browsers, etc. A user interface can be displayed on a client device using an application or other software executing on the client device, software on the server device, and/or a combination of client software and server software executing on server 102, e.g., application software or client software in communication with server 102. The user interface can be displayed by a display device of a client device or server device, e.g., display screen(s), projector, etc. In some implementations, application programs running on a server can communicate with a client device to receive user input at the client device and to output data such as visual data, audio data, etc. at the client device. In some implementations, one or more devices of network environment 100, e.g., one or more servers of the server system 102, may maintain an electronic encyclopedia, a knowledge graph, one or more databases, a corpus of words, phrases, symbols, and other information, a social network application (e.g., a social graph, a social network for friends, a social network for business, etc.), a website for a place or location (e.g., a restaurant, a car dealership, etc.), a mapping application (e.g., a web site that looks up map locations), call characteristics and other call data, etc. In some implementations, server system 102 may include classifiers of particular types of content items (e.g., text or images), and can determine whether any of particular classes are detected in received content items.

Some implementations can provide one or more features described herein on client or server devices disconnected from or intermittently connected to computer networks. In some implementations, a client device can provide features and results as described herein for asynchronous communications, e.g., via chat or other messages.

Machine learning models can be used by server system 102 and/or one or more client devices 120-126 as described herein. In some implementations, the machine learning models may be neural networks with one or more nodes, arranged according to a network architecture, e.g., in one or more layers, with various nodes connected via the network architecture, and with associated weights. For example, in a training stage of the model, a model can be trained using training data, and then at an inference stage, the trained model can determine output based on input data. In some implementations, a model may be trained offline, e.g., on a test device in a test lab or other setting, and the trained models may be provided to the server that executes the models. In some implementations, the trained model may be retrained or updated locally on-device, or an untrained model may be trained on-device. In some implementations, with user permission, federated learning may be utilized to update one or more trained models, e.g., where individual server devices may each perform local model training, and the updates to the models may be aggregated to update one or more central versions of the model.

Figure 2:
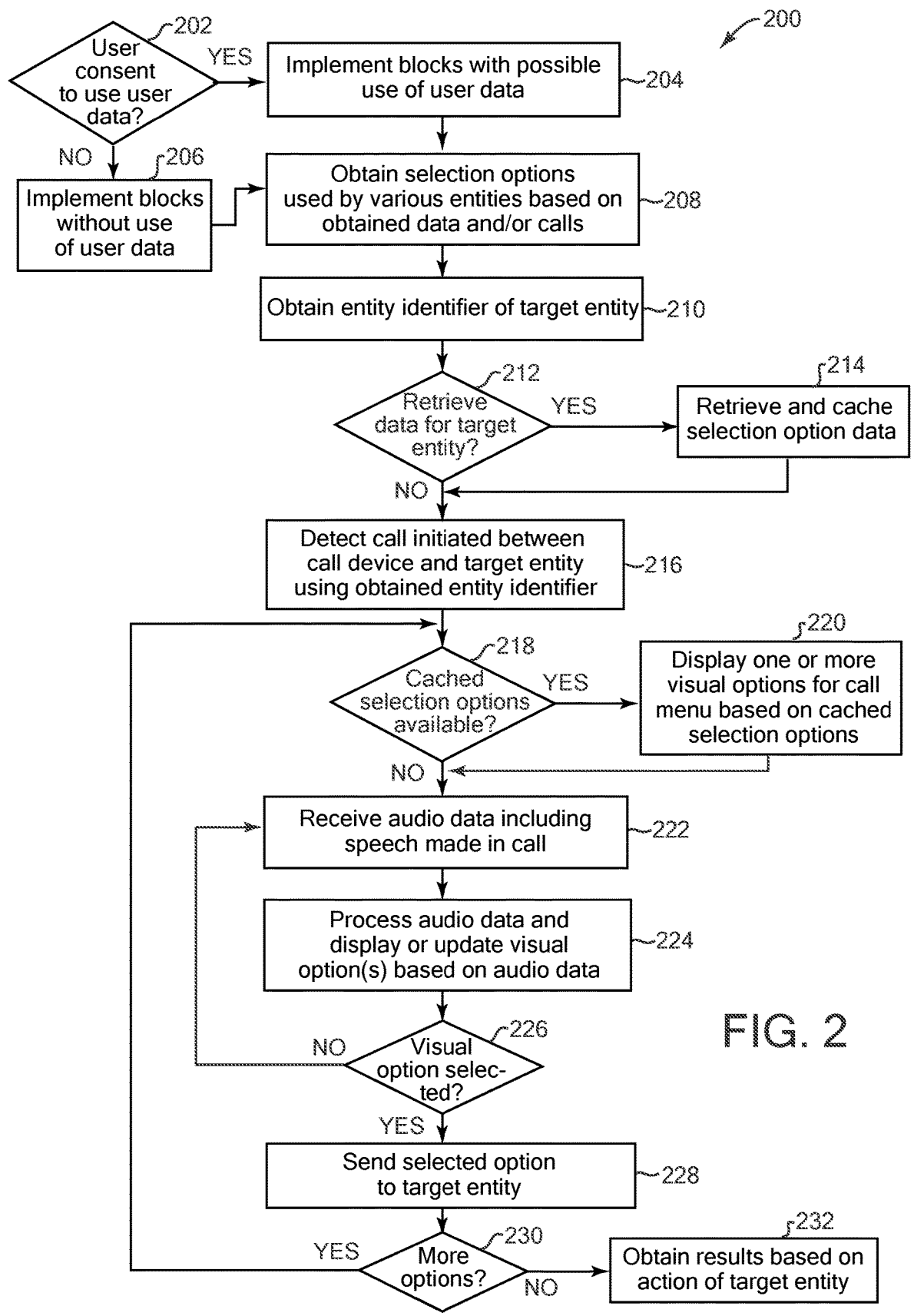
FIG. 2 is a flow diagram illustrating an example method to determine and visually display spoken menus for calls, according to some implementations.

FIG. 2 is a flow diagram illustrating an example method 200 to determine and visually display spoken menus for calls, according to some implementations. In some implementations, method 200 can be implemented on a server, e.g., server system 102 as shown in FIG. 1. In some implementations, some or all of the blocks of method 200 can be implemented on one or more client devices (e.g., client devices 120, 122, 124, and/or 126 as shown in FIG. 1), one or more server devices, and/or on both server device(s) and client device(s). In described examples, the system(s) implementing the blocks of method 200 include one or more processor hardware or processing circuitry ("processors"), and can access one or more storage devices such as database 106 or other accessible storage. In some implementations, different components of one or more server systems can perform different blocks or portions of blocks.

Some implementations can initiate method 200, or portions thereof, based on user input. A user may, for example, have selected the initiation of method 200 or particular blocks of method 200 from a displayed user interface. In some implementations, method 200 or portions thereof can be performed with guidance by the user via user input. In some implementations, the method 200, or portions of the method, can be initiated automatically by a device. For example, the method (or portions thereof) can be periodically initiated, or initiated based on the occurrence of one or more particular events or conditions. For example, such events or conditions can include obtaining selection option data indicating one or more selection options provided in calls to entities (e.g., to cause block 208 to be performed), a predetermined time period having expired since the last performance of method 200 or portion thereof, and/or one or more other events or conditions occurring which can be specified in settings of a device implementing method 200.

In some examples, a device (server or client) can perform the method 200 with access to selection options data in calls (if user consent is received).

In block 202, it is checked whether user consent (e.g., user permission) has been obtained to use user data in the implementation of method 200. For example, user data can include user preferences, user-selected responses (e.g. in dialer applications, communication applications, or other applications), user call characteristics data (e.g., call durations, times and locations of calls, audio data received during a call, etc.), other content in user interfaces of a device, or other content data items in a content collection (e.g., calls associated with a user), messages sent or received by a user, information about a user's social network and/or contacts, content ratings, a user's geographical location, historical user data, etc. One or more blocks of the methods described herein may use user data in some implementations.

If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, the remainder of method 200 is not performed, and/or particular blocks using the user data are not performed. In some implementations, if user consent has not been obtained, blocks of method 200 are to be implemented without use of user data and with generic or publicly accessible and publicly-usable data.

In block 208, selection options that are provided by various entities in previous calls are determined for entity identifiers of the entities based on obtained data and/or calls made to the entity identifiers. Selection options are options that are provided via audio data by the entity (e.g., a server device that is configured to automatically answer calls and provide audio data) to a user (e.g., call device) in a call between the entity and the call device. In some implementations, selection options can be options in a call menu that is provided by a target entity. In some implementations, a call menu can include multiple levels (e.g., hierarchical levels) of sets of options, e.g., presenting one set of options at one menu level and presenting another or different set of options in a different menu level that is based on an option selected in the previous menu level.

In some implementations, a selection option can be a selectable element or area presented in a user interface that is not included in a call menu or other menu, e.g., a selectable button, link, or other element that causes an action by a target entity (e.g., examples described for block 232). Such a selection option can be determined from speech provided during a call, e.g., before, within, or after call menu options are spoken in the call, or from speech in a call that does not provide any call menu options.

In some implementations, structured (or annotated) information can be determined from speech provided by various entities in calls, and the structured information can be presented as selection options and/or visual information. For example, an outline, tree, formatted text (e.g., text that has had paragraph breaks, sentence breaks, and/or page breaks, punctuation, etc. added by the system), or other structured information can be determined from the speech. In further examples, structured information can include Uniform Resource Locators (URLs), hyperlinks, emails, dates, locations, confirmation numbers, account numbers, etc., which can be selection options that are actionable, e.g., selectable by user input to cause the system to perform one or more operations such as retrieving and displaying information or a web page, open or execute a program, etc. Some structured information may be presented as visual information that is not actionable or selectable by user input. Structured information can be determined and displayed by a call device during calls as selection options or in addition to selection options described in examples herein.

The target entity active in a call can be an automated system such as an interactive voice response (IVR) system of an entity, an answering machine that can offer a call menu and receive selections from caller, or in some cases a human agent of the entity that speaks options in a call and receives spoken selections of those options from the call device. In a call presenting selection options, a user is able to select one or more of the options to navigate (e.g., advance or go back) through one or more hierarchical menu levels of the call menu, and/or obtain a desired result such as receive particular information, request a particular product or service, request to speak to a live human agent that can answer questions, etc. A call can be a phone call, voice call, or other call (e.g., placed via instant messaging or an over-the-top (OTT) service, etc.) connected to a call device used by the user, e.g., initiated or answered by the call device. Selection options are determined in block 208 for various entity identifiers of entities that provide such options in calls with the entity. As referred to herein, a target entity is an entity that is to be called or is active in a call (e.g., after a call device has called the target entity, or vice-versa), and is associated with one or more entity identifiers (e.g., target entity identifiers), such as a phone number or other address information (e.g., user or entity name, user identifiers, etc.) that can be used to connect the target entity to a call that allows voice communication. Entities can include any of various persons, organizations, businesses, groups, etc.

In some implementations, the selection options are determined based on entity data received from the entities (including from associated entities, e.g., call centers or other entities handling calls for the entity). In some implementations, the selection options are determined based on previous calls made by call devices to entities.

Block 208 can be performed as a preprocessing block that determines and stores selection option data prior to initiating a call to a target entity and prior to determining and visually displaying selection options for a current call as described below. Some examples of obtaining selection options provided by entities are described with reference to FIG. 3. The method continues to block 210.

In block 210, an entity identifier of a target entity is obtained by a call device. The call device is a device that can be used to make calls to an entity, e.g., a client device 120-126 of FIG. 1, or alternatively a server or other device. The entity identifier can be, for example, a phone number, other call name, address, or other entity identifier that allows a call to be initiated to the target entity by the call device. The entity identifier can be obtained in any of several ways in various implementations and/or cases. For example, the entity identifier can be obtained via user input from a user of the call device. Such user input can include the user selecting keys of a physical or virtual keypad or keyboard to input the identifier. In some examples, the entity identifier can be obtained in response to the user selecting a contact entry in a contact list stored on the call device, which causes an entity identifier associated with that contact entry to be automatically retrieved from storage and provided for use. For example, the entity identifier can be input or provided to an application running on the call device, such as a dialer or call application that initiates calls, or another application that can initiate calls. In some other examples, the entity identifier can be obtained from another application running on the call device or from a remote device over a network.

In some examples, the entity identifier is received independently of a call, e.g., to view displayed selection options offered when calling the entity, in preparation for one or more upcoming calls to the target entity, etc., without initiating a call at the time the identifier is received and/or at the time the selection options are displayed. In other examples, the entity identifier is received to immediately initiate a call to the target entity at the current time, e.g., the identifier is received in a dialer or call application and a control to initiate the call is selected by the user, or the call is automatically initiated by the call device. In some implementations, the entity identifier is received during a (current) call to the target entity or to a different entity. For example, the entity identifier can be received by the call device to initiate a current call that may already be in progress, or to initiate a second call to a different entity. The method may continue to block 212.

In block 212, it is determined whether selection option data is to be retrieved for the entity identifier of the target entity. For example, it can be determined whether selection option data is available to be retrieved. In some examples, selection option data for various entities may have been previously obtained or determined in block 208, e.g., by a system that is accessible to the call device (e.g., a server or other remote device connected over a network) and/or by the call device, as described in examples of FIG. 3. In some implementations, a portion of an entire set of selection option data for the target entity identifier may have been obtained or determined in block 208 and is available to be retrieved. In some cases, the selection option data obtained in block 208 does not include data for the target entity identifier and selection option data is not available to be retrieved.

In some implementations, selection option data may already be stored by the call device, such that selection option data need not be retrieved in block 212. For example, selection option data for the target entity identifier may have previously been determined (e.g., prior to block 210) based on one or more previous calls to the target entity identifier by the call device. If only some of the selection options in a call menu of the target entity identifier was previously determined and stored by the call device, then the other remaining selection option data can be retrieved.

In another example, the selection options for the target entity identifier, or a subset thereof, may have been previously retrieved as selection option data by the call device from one or more remote devices. In some implementations, the selection options, or a subset thereof, can be retrieved and stored in local storage of the call device prior to receiving the target entity identifier (or any portion thereof) in block 210. This may enable faster access to and display of the selection options by the call device as compared to retrieving the selection options from a remote device over a network (e.g., from server, client device, or other device) at the time that the entity identifier is obtained.

In some implementations, a subset of the selection option data available on the remote device can be received and stored (e.g., cached) in local storage of the call device prior to initiation of block 210. For example, the selection option data for popular entity identifiers called by users can be obtained and stored locally by the call device. In some examples, these popular entity identifiers can be the most frequently called in a set of entity identifiers (e.g., called the most number of times of a set of entity identifiers, or a higher number of times than other entity identifiers that are not cached in local storage), the most frequently called (as above) within a particular time period, and/or the most frequently called (as above) by users located in the same geographic location or region of the call device (or having similar other characteristics to the user/call device). In another example, selection option data for entity identifiers that have been previously called at least a threshold number of times by callers in a geographic area (or threshold distance) of the call device can be obtained and stored locally by the call device. In another example, selection option data can be downloaded for entity identifiers that are located in the country of the user or a country in which the call device is currently located.

If selection option data for the target entity identifier is not to be retrieved as determined in block 212, the method may continue to block 216, described below. If selection option data is to be retrieved, the method continues to block 214. In block 214, the available selection option data is retrieved and cached (or otherwise stored) in local storage of the call device. The cached selection option data can be used to display selection options during a call, as described below. For example, the call device can retrieve the selection option data associated with the target entity identifier over a network from a remote device (e.g., from a repository of call menu selection options for various entities), such as a server or other device, and cache the selection option data in local storage of the call device. In some implementations, the cached selection option data can include data indicating the structure of a call menu in which the selection options are organized. In some implementations, with user permission, portions of original audio data (or signatures thereof) from a call that were analyzed to determine the selection options may be cached in association with selection options.

In some implementations, the call device can request to pre-fetch one or more selection options from a remote device before the entity identifier is completely obtained by the call device in block 210, e.g., prior to the user completing input of the entity identifier to the call device. For example, the call device can request and download selection options from the remote device for multiple candidate entities (e.g., the most frequently called entities or entity identifiers in the geographic region of the call device, similarly as described above) that match the portion of the entity identifier that has been input so far. The call device can then select and use the set of selection options associated with the entity identifier after the identifier is completely specified. Such pre-fetching may allow selection options to be displayed by the call device more quickly after the entity identifier is specified, since the download of selection option data is initiated prior to the identifier input being completed and selection options are displayed from local storage.

In some implementations, pre-fetching of selection option data is performed if a threshold portion of the complete entity identifier has been received. In some examples, if complete entity identifiers are 10 digits, then the pre-fetching can be performed after, and not before, the 8th (or, alternatively, 9th) digit of the partial identifier has been received. This allows the number of candidates to be narrowed to an amount of data that can be received at the call device in a relatively short time sufficient to determine the matching selection option data after the complete identifier is received. In some implementations, a subset of a larger amount of selection option data is determined, e.g., by the call device or the remote device, to be pre-fetched by the call device. For example, the subset of data can be associated with entity identifiers that are the most likely identifiers to be input by the user, as determined, with user permission, based on one or more factors such as history data indicating which entities that the user has previously called (e.g., the most frequent and/or the most recent entities previously called) and/or entities mentioned in user data (recent messages, accessed with user permission, ect.).

In some implementations, the cached selection option data stored by the call device can be periodically updated with newer or corrected data based on particular conditions occurring, e.g., in response to the data being corrected based on a call by the call device, in response to the data being updated at the remote device (e.g., based on recent calls made by other users, adding new entities or entity identifiers, etc.), periodically after each particular time period, etc.

In some implementations, the selection option data (or portion thereof) can be determined on the call device during a call (as described below) and is not downloaded from a different device. The method may continue to block 216.

In block 216, a call is detected to have been initiated between the call device and the target entity using the obtained entity identifier. In some implementations, the call connects the call device with a device that is associated with the target entity. The call can be any connection with a target entity that includes audio, e.g., a phone call, a call via an OTT application, a call via an application program (e.g., a browser, a banking app, a browser, etc.), etc. In some implementations, the call can optionally be a video call in which video data is transmitted to cause display of video images of caller and/or callee at the call device and/or the target entity device connected to the call. In some examples, the user of the call device may have initiated the call, e.g., selected a call control in a user interface of an application such as a dialer application or call application to cause the call device to dial the entity identifier and initiate the call with the target entity. In some examples, the call may have been initiated automatically by an application of the call device, e.g., after the entity identifier was obtained in block 210. In these cases, the user and call device are the caller. In some other examples, the call may have been initiated by the target entity, in which case the target entity device is the caller and the user and call device are the callee. Herein, an automated system (e.g., IVR system or answering machine) and/or a human agent that may be active in a call and representing the target entity are referred to as the target entity. The method continues to block 218.

In block 218, it is determined whether cached selection options are available for display in the call with the target entity (e.g., cached selection options that are relevant for display in the current menu level or other stage of the current call). As described above with respect to blocks 212 and 214, selection options for the entity identifier of the target entity may have been cached in storage of the call device. In some implementations, there may be selection option data cached in local memory that was determined and stored earlier in the current call (or in a previous call by the same call device), e.g., from one or more previous iterations of blocks 222-230 below, and this cached data may be relevant for display in the current stage (e.g., if the user has gone back to a previous menu level in the call menu in the current call). If no cached selection options are available, or if it is determined that the available cached selection options are not associated with or relevant to the current stage of the call (e.g., a particular hierarchical level of a call menu which the user has navigated to), then the method continues to block 222, described below.

If relevant cached selection options are available for display, then the method continues to block 220, in which one or more visual options (e.g., of a call menu) are displayed based on one or more corresponding cached selection options. Visual options are displayed items in a user interface of the call device that, for example, can correspond to selectable options of a call menu that is normally spoken to the user in the call. For example, the visual options can be displayed within an interface of a dialer application or other application, or in a message or notification displayed on the call device. In some implementations, the visual options can be displayed in a separate window or display area, and/or in response to the user selecting a control to command the display of the visual options.

Visual options can include text, symbols, images, emojis, icons, and/or other information and present an option which is selectable by the user. In some implementations, a visual option is selectable by the user providing touch input, e.g., touching or otherwise contacting a touchscreen in a location corresponding to the display of the visual option. In some implementations, one or more of the visual options are associated with a designator (e.g., number, name, keyword, etc.) that is normally spoken or input by a user (e.g., via a key press) during a call to select the option associated with the designator. Some examples of displaying visual options are described with reference to FIG. 4 (referring to block 224 of FIG. 2), and with reference to FIGS. 5-13, described below.

The visual options may be displayed in block 220 prior to the corresponding selectable options being spoken in the call by the target entity, e.g., by an automated system (e.g., IVR system or answering machine) or by a human agent. Thus, the user can immediate view one or more, or all, of the selectable options available to the user without having to wait to hear the options via a slower method of speech. In some implementations, only the selection options for a current level in a hierarchical call menu can be displayed, or in other implementations, selection options from multiple levels of a call menu can be displayed, e.g., so that the user can view a selection path through the levels of the call menu. In some implementations, or if commanded by the user or user settings of the call device, the visual options can be displayed prior to a call being initiated on the call device using the entity identifier, based on the cached selection options. In some implementations, the visual options are displayed after the call is initiated. For example, the selection options can be displayed in an interface of a dialer application or other application (or as a notification by an operating system) so that the user can view the visual options prior to initiating a call.

In some implementations, the visual options can also or alternatively include other selectable items. For example, visual options can provide information e.g., related to the target entity, and may be related or unrelated to options of a call menu. Visual options can include selectable items or portions, such as buttons or checkboxes that can be selected by the user to send particular choices or information to the target entity. In some examples, visual options can include web links or other types of links to various sources of information. For example, if selected by the user, such links can cause a web page, window, or other display area to be opened on the call device, e.g., in a browser application or other application, and cause information to be downloaded for display therein. In some implementations, other visual information can be displayed (e.g., structured information) that is not selectable as described above, e.g., in addition to visual options. The method may continue to block 222.

In block 222, audio data is received from the call, including audio data indicating or representing speech made in the call by the target entity (e.g., an automated system or human agent) and by the user. The method may continue to block 224.

In block 224, the audio data is processed and visual options are displayed and/or updated based on the audio data. For example, text is determined from the speech represented in the audio data, where the text represents the speech. Selection options of a call menu (and/or other selection options) are determined based on the text, the selection options allowing a user of the call device to navigate through a call menu. In some implementations or cases, the selection options are displayed as visual options by the call device. In some implementations or cases, visual options are already displayed based on cached selection options (e.g., based on block 220) and these visual options and corresponding selection options can be updated based on the processed audio data, if appropriate. In some implementations, a structure of a hierarchical call menu that includes the selection options can also be determined based on the audio data and text derived therefrom. Some examples of displaying and/or updating visual options are described below with reference to FIG. 4.

In some implementations, block 224 can be skipped or omitted, e.g., if cached selection options have been displayed by the call device in block 220. In some implementations, block 224 can be skipped if the cached selection options are recently determined and thus more likely to be current.

The audio data received in the call is also output by the call device, e.g., after an audio system of the call device processes the audio data, such that speech in the audio data is played via a device speaker, headphones, or other audio device in or connected to the call device. The method may continue to block 226.

In block 226, it is determined whether one or more visual options have been selected by the user. Various implementations can allow one or more methods of selection of visual options. For example, visual options can be selectable by a user via a touchscreen interface, voice command, physical input device (mouse, joystick, trackpad, etc.), or other user input device. If none of the visual options are selected in block 226, the method continues to block 218 to receive additional audio data from the call. If one or more of the visual options are selected, the method continues to block 228.

In block 228, the selection option(s) that correspond to the selected visual option(s) are sent to the target entity. In some implementations, an indication of the selection is sent to the target entity, where the indication corresponds to input provided as if the user performed the standard selection of an option in the call. In some examples, if the selected option can normally be selected via user speech (e.g., speaking a designator such as number or word(s) associated with the selection option), the sent indication can be the appropriate speech spoken by the call device in the call, e.g., in a voice that is a recording or synthesized by the call device that speaks the appropriate designator. In some examples, the user can select a visual option via non-voice input (e.g., touching a button or area displayed on a touchscreen), and the call device can output the speech that selects the corresponding selection option via speech. In another example, if the selected option can normally be selected via press of a key of a keypad or keyboard, the call device can send an indication that is a signal that corresponds to a user pressing that key on a device. For example, such a signal may include a touch tone (e.g., dual tone multi-frequency or DTMF signal) or encoding thereof, or other in-band signal corresponding to a particular key that is pressed. In some implementations, alternatives to touch tone or key-press input can be used, e.g., an out-of band signal such as a signal provided via Session Initiation Protocol (SIP), Real Time Transport Protocol (RTP), H323, etc. The method may continue to block 230.

In block 230, it is determined whether there are more selection options to display. For example, the user's selection of block 226 may cause navigation to a next level of the call menu (e.g., navigating forward or back in the call menu). The target entity can start presenting that next level in the call, e.g., by speaking a new set of selection options for the user based on the previous selected option, where the new set of options can be displayed by the call device. In some cases or implementations, the new set of selection options is in a previous level of the call menu to which the user previously navigated, and those selection options may have been cached in a previous iteration of method 200. Such cached selection options can be retrieved from the cache in local memory of the call device. If there are more selection options to display, the method continues to block 218 to check if cached selection options are available for the new set of selection options.

If there are no selection options to display in block 230 in response to the user selection, then the method continues to block 232, in which results are obtained based on one or more actions by the target entity. The target entity can perform any type and/or number of actions in response to receiving the selected option. For example, the action can be the presentation of information that is received from the target entity, e.g., if the user's selection is the last option in a particular path through the call menu. For example, the target entity may present (e.g., speak) information in the call that the user has requested, which is received by the call device in block 230. In some implementations or cases, the call can be ended after such information is received. In some implementations or cases, the target entity may request that the user speak information, e.g., the user's name or other information (address, account number, etc.). In some implementations, the target entity can connect a human agent of the target entity to the call to speak to the user, which can be detected by the call device (e.g., using speech recognition techniques) and a notification provided to the user.

In some cases, the target entity's action may include putting the call device on hold, e.g., waiting for a human agent to become available. In some implementations, the call device (and/or connected devices) can automatically determine, without user input or intervention, whether the call device is on hold in the current call, e.g., by using speech recognition techniques to determine whether an automated system of the entity is indicating the call is on hold via particular words (e.g., "an agent can take your call in 10 minutes, thanks for waiting") or via music playing that indicates a hold status. In some implementations, if the call has been placed on hold by the target entity, the call device can display an indication of that hold status, e.g., a message that shows music playing, etc. In some implementations, the call device can detect whether a human agent has connected to the call while the call is on hold, e.g., via particular words spoken by the agent or user, cessation of hold music or an automated voice, etc., such that the call is no longer on hold.

In some implementations, the call device can output a notification that indicates that the call is no longer on hold and a human agent is connected to the call.

In some implementations or cases, an option is presented by the target entity to return to the call menu after the action is taken by the target entity, in which case the process can continue to block 218.

In some implementations, after the call has ended, selection options that were determined and displayed by method 200 can be stored in a cache (or other storage) of the call device and/or can be sent to storage of a remote device (over a network connection), such as a server, that stores selection option data for various entities and which is accessible by multiple call devices. If the same target entity identifier is called again by the user using the call device (or other user device or client device), the selection option data stored in the cache of the call device and/or stored on the remote device can be used for the new call, e.g., to display selection options prior to those options being spoken in the call. In some implementations, some of the selection options can be retrieved from local storage of the call device (e.g., having been previously stored in the local storage based on a call in which these selection options were selected) and/or some selection options can be retrieved from a remote device, similarly as described above. Similarly, any updates or corrections to cached selection options can be cached on the call device and/or sent to storage of selection option data for various entities at a remote device such as a server.

In some implementations, with user permission, data that indicates events and/or results of a call can be stored as metadata with the selection options that are stored after a call. For example, with user permission, result data can include indications of which selection options were selected in the call, whether the user was able to connect to a human agent after dialing particular selection option(s), duration and selection options selected before the user disconnected from the call, etc. Such data, when accumulated from multiple calls and call devices, can be used to determine whether to modify selection options provided by the entity in future calls, e.g., to improve the effectiveness and efficiency of a presented caller menu.

In some implementations, if user consent has been obtained, a transcript of the call and/or selection options selected by the user during the call can be stored and can be available for the user to view, e.g., from a call log on the call device or other user interface.

Figure 3:
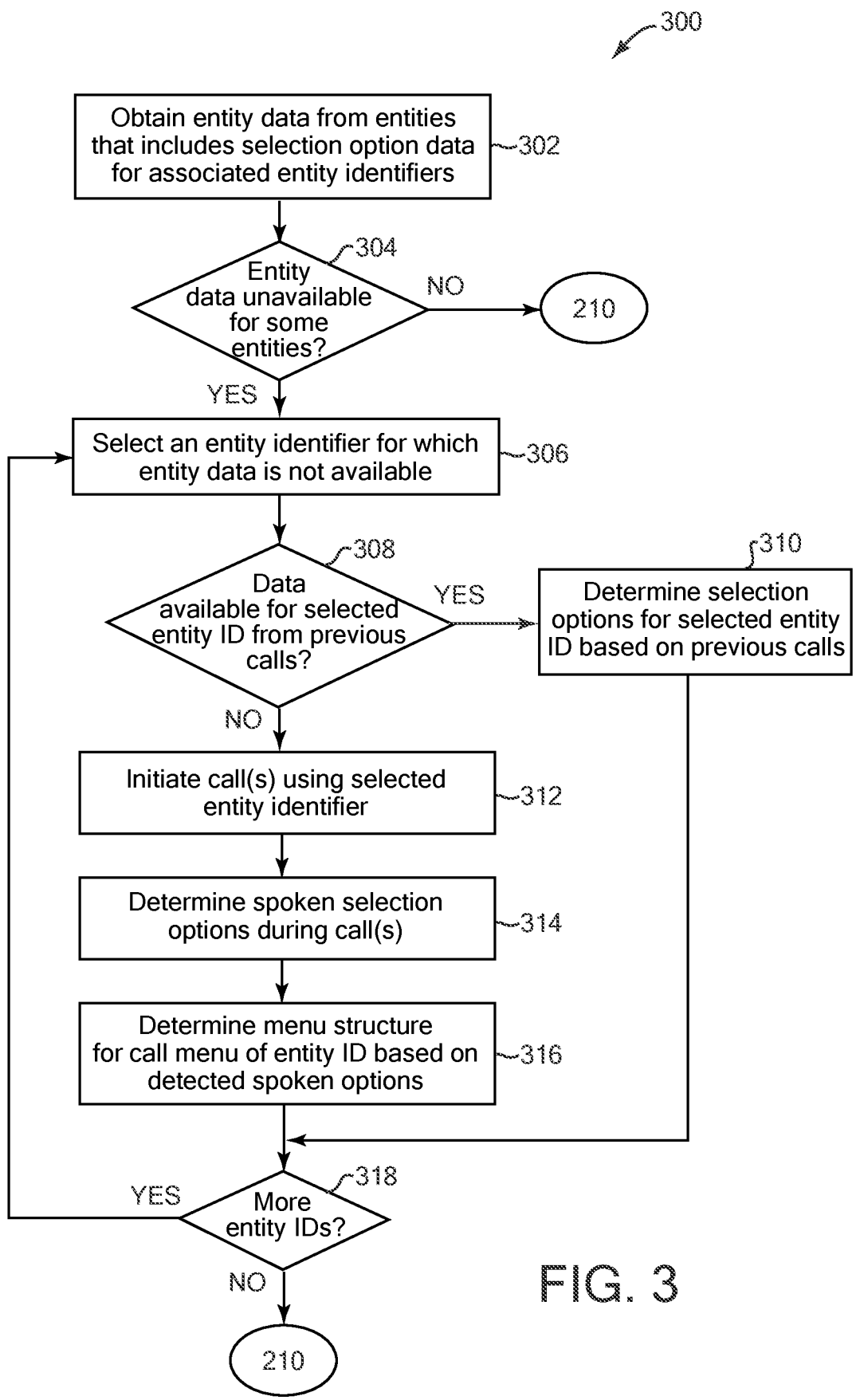
FIG. 3 is a flow diagram illustrating an example method to obtain selection options of entities based on obtained data and/or calls, according to some implementations.

FIG. 3 is a flow diagram illustrating an example method 300 to obtain selection options of entities based on obtained data and/or calls, according to some implementations. For example, method 300 can be implemented as block 208 or a portion of block 208 of FIG. 2 to obtain selection options of entities prior to a call to a target entity in which such selection options may be used. In some implementations, method 300 can be performed by a server or other device besides a call device, e.g., to obtain selection options that can be downloaded or accessed by a call device (e.g., a client device or other device) before or during a call to a target entity as described with reference to FIG. 2. In some implementations, method 300 can be performed by a call device, e.g., a client device, or different portions of method can be performed by a server device and/or a client device, respectively.

The method begins at block 302. In block 302, entity data is obtained from a set of entities, the entity data including selection option data for entity identifiers associated with the entities in the set of entities. In some implementations, entity data can be made available by entities for the purposes of providing selection options in calls to those entities. For example, the entity data can include indications of selection options that are spoken in the call menu of the associated entity during a call using an entity identifier of the entity identifier, including the text and other specifics of the options, and/or the hierarchical structure of the call menu in which the selection options appear. In some examples, entity data can be sought for a particular set of entities (or entity identifiers) that satisfy particular criteria. For example, the set can include a number of entities that have entity identifiers that are the most popular to be called in the region or area of the call device and/or within a particular time period. For example, popular entity identifiers can be the most frequently and/or recently called similarly as described above, and the calls can be made within a particular time period and/or by callers within a threshold distance or geographic area of the call device. In some implementations, entity data can be periodically obtained from entities so that more recent updates are included in obtained entity data. In some implementations, entity data can be obtained from entities that are associated with the entities represented by entity identifiers, such as call centers or other entities associated with the entity. The method continues to block 304.

In block 304, it is determined whether entity data is unavailable for one or more entity identifiers of the set of entities from which entity data is sought. In various examples, entity data may not be provided by an entity due to any of various reasons (e.g., security restrictions, a tendency of selection options to be changed and made obsolete quickly, technical problems, etc.). In some implementations, entity data for an entity identifier can be considered unavailable if the available entity data is known to be out of date and/or incorrect. If entity data is available from the set of entities, the method continues to block 210 of FIG. 2, described above. If entity data is not available from one or more entities of the set of entities, the method continues to block 306.

In block 306, an entity identifier for which entity data is not available from an entity is selected from the entity identifiers associated with the set of entities. In some implementations, this can include entity identifiers for which entity data is known to be incomplete, e.g., the entity data may specify some but not all of the selection options of a call menu. In some implementations, incomplete entity data may be determined from user feedback that indicates one or more selection options are missing (or incorrect) in cached selection options that are displayed during calls based on obtained entity data, and thus the entity data is likely to be incomplete. The method continues to block 308.

In block 308, it is determined whether selection option data is available for the selected entity identifier from one or more previous calls that include the selected entity identifier. For example, one or more users may have called using the selected entity identifier on previous occasions and selection options received during those calls may have been retained, e.g., detected and/or stored, with user permission. In some implementations, other call characteristics of those calls (e.g., entity identifier, time of call, location of call, duration of call, etc.) may have also been retained, with user permission, where the call characteristics have been disassociated from the users that made the calls so that only the call characteristics are known. Some or all of such data may be available to method 300. For example, the previous calls may have been made by a population of users using call devices from which the call characteristics are obtained, with user consent, over a communication network. If no such data is available, the process may continue to block 312, described below. If such selection option (and/or other data) is available, the process continues to block 310.

In block 310, selection options are determined for the selected entity identifier based on the previous calls. One or more selection options may be determined, if user consent has been obtained, automatically by a system based on analysis of speech data in audio data recorded from the previous calls using techniques such as speech recognition via machine learning models or other techniques (as described below with reference to FIG. 4). For example, selection option data determined from a previous call to the selected entity identifier may indicate the text of the selection options presented in that call, and/or structural data of a call menu that includes the selection options presented in the call (e.g., the hierarchical structure of the selection options in the call menu and the dependency of particular options to previously-selected options, indicating which selections of previous options are needed to access those options). In some implementations, a particular call may have navigated to and logged some of the selection options in the call menu, but not all of the selection options. For example, in a logged call, a user may have selected a single navigational path of successive selection options through the call menu without going down any other paths or branches of options. In some implementations, block 310 can include examining multiple previous calls to the selected entity identifier that follow different branches of selection options in the call menu until all of the selection options in each branch of the call menu is determined, if possible. In some implementations, with user permission, portions of audio data (or signatures thereof) that were analyzed to determine the selection options may be stored in association with the determined selection options. The method may continue to block 318, described below.

In block 312, after selection option data is determined to not be available from previous calls for the selected entity identifier, one or more calls using the selected entity identifier are initiated. In some implementations, an automated system can be used to call the selected entity identifier one or more times. In some implementations, the calls can be made at particular times, e.g., within business hours if the entity is a business. In some implementations, multiple calls can be made at various times, e.g., outside of business hours, to determine different selection option data that may be presented at such various times. The method continues to block 314.

In block 314, selection options spoken in the call(s) are determined, e.g., detected and stored, such that selection options for the selected entity identifier are determined. In some implementations, the selection options are detected using one or more speech recognition techniques, e.g., machine-learning models or other techniques. Some examples of detecting selection options and menu structures from audio speech data are described below with respect to FIG. 4, and similar techniques can be used in block 314. In some implementations, block 314 includes selecting selection options presented in the call(s) to navigate to further hierarchical levels of the call menu and receive the audio data at those levels to detect further selection options. In some implementations, a different navigation path of selection options through the call menu can be selected in each call to the selected entity identifier in order to determine each available selection option in the presented call menu. In some implementations, the same path of selection options can be navigated in multiple calls, e.g., to provide additional data for comparison and to check for errors in detection of selection options. In some implementations, if some selection options were available prior to block 314 or prior to an iteration of block 314, the parts (e.g., branches) of the menu that are not yet determined can be selected to determine provided selection options and the available options or parts can be skipped. In some implementations, with user permission, portions of the audio data (or signatures thereof) analyzed to determine the selection options may be stored in association with the determined selection options. The method continues to block 316.

In block 316, a menu structure for a call menu of the selected entity identifier can be determined based on the detected selection options of block 314. For example, the detected selection options are stored and a data structure (e.g., graph, tables, etc.) is created which provides the relationships and dependencies between selection options at different hierarchical levels of the call menu. The selection option data from multiple calls to the selected entity identifier can be examined to form as complete a call menu structure as possible from the available data. In some implementations, a structure of the selection options in the call menu may have been previously determined, e.g., based on partially-complete entity data from block 302, or previous iterations of method 300. Selection option data from calls made in blocks 312 and 314 can be added to such an existing data structure. The method may continue to block 318.

In block 318, it is determined whether there are more entity identifiers to select for which entity data is not available and selection option data can be determined. If so, the process continues to block 306, in which another entity identifier is selected for which to determine selection option data. If there no more entity identifiers to select, the process may continue to block 210 in FIG. 2.

Figure 4:
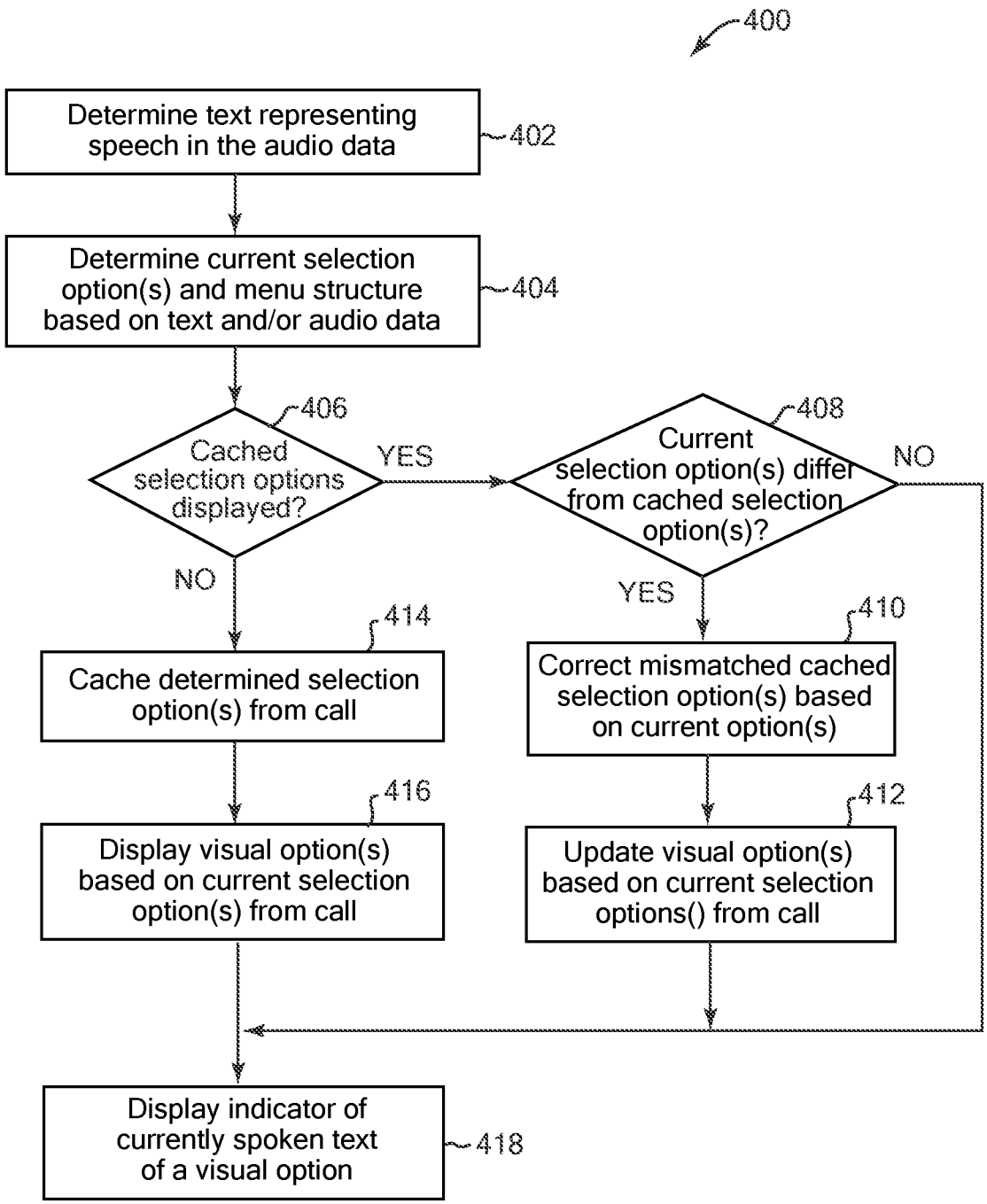
FIG. 4 is a flow diagram illustrating an example method to process audio data from a call and display or update visual options based on the audio data, according to some implementations.

FIG. 4 is a flow diagram illustrating an example method 400 to process audio data from a call and display or update visual options based on the audio data, according to some implementations. For example, method 400 can be implemented in block 224 of FIG. 2, after block 222 in which audio data is received in a call that has been initiated with the target entity using the obtained entity identifier.

The method begins at block 402. In block 402, text representing speech in the audio data of the call is determined. In some implementations, the text is determined using one or more speech recognition techniques, e.g., using one or more machine-learning models and/or other techniques. In some implementations, e.g., if the user has given permission and/or set an associated user setting, the call device can provide a transcript of the call in which the recognized text of all of the words spoken in the call are displayed, including introductory speech, user responses, etc. The method continues to block 404.

In block 404, one or more current selection options and/or menu structure are determined based on the text determined in block 402 and/or the audio data received in block 222. In some implementations, each selection option commonly includes a described option for selection which may be accompanied by a selection designator for the option that the user is to input to the call to select that option, e.g., by saying the designator or pressing a corresponding key or button on the call device (e.g., to provide a tone as provided by a touch-tone telephone, or other signal as described with reference to FIG. 2). In some examples, selection options can be detected based on particular spoken words (or other spoken designators) that may indicate or delineate a selection option being presented. For example, a selection option may commonly include the word "to" followed by a verb (e.g., "to speak to a representative" or "for your account balance,") or the word "for" followed by a noun (e.g., "for Spanish" or "for your account balance"). Selection options may commonly start or end with a phrase that includes "press" or "say" followed by a designator such as a number or word, e.g., "press or say two." In some implementations, speech recognition techniques can be oriented or trained to recognize such words to detect selection options.

In some implementations, a menu structure for a call menu of the selected entity identifier can also be determined or added to based on the detected selection options, e.g., if the audio data and/or determined selection options indicate that a different level of the call menu has been accessed in the call. This can occur, for example, after the user selects a presented selection option. In some examples, a data structure (e.g., graph, tables, etc.) can be created which provides the relationships and dependencies between selection options at different hierarchical levels of the call menu. In some implementations, determined and user-selected selection options can be examined to form a call menu structure that is added to as the call progresses and further options are selected. In some implementations, the call menu structure can be compared to a cached call menu structure (e.g., which can be similar to cached selection options as described herein), and/or the call menu structure can be stored and accessed in future calls to the target entity to provide the call menu structure for those calls, as described herein.

In some implementations, one or models can be used to detect selection options and/or menu structure from audio speech data and/or text determined from audio speech data. In various implementations, these models can be different than models used to determine text representing speech in audio data as used in block 402, or the functionality of these models can be included in the same models used in block 402. In some implementations, models to detect selection options can be trained based on call characteristics of the previous calls, including audio data providing spoken selection options, text selection options, call menu structures, etc. In some examples, models can be trained with training data that provides examples of words that correspond to selection options, and/or training data that includes non-textual data (e.g., audio data snippets or signatures corresponding to selection options). In some implementations, the model is a machine learning model, e.g., a neural network with one or more nodes, arranged according to a network architecture, e.g., in one or more layers, with various nodes connected via the network architecture, and with associated weights. For example, in a training stage of the model, a model can be trained using training data, and then at an inference stage, the trained model can provide output based on input data. Additional examples of features that can be included in the model are described below with respect to FIG. 15. Other types of models or techniques can also or alternatively be used to detect selection options.

In some example implementations, a system including one or more machine learning model(s) processes the audio data from the call in a streaming fashion, running the audio data through speech recognition model(s) to provide text (as in block 402) and then through a dedicated neural net pre-trained from BERT (Bidirectional Encoder Representations from Transformers) or other suitable encodings to detect selection options and/or call structure. In addition, the audio data can be processed directly with an audio-to-intent architecture and a result may be based on the combination of outputs. The output provides a set of selection options and a call menu structure (e.g., hierarchical structure) of those options as detected from the audio data.

Some implementations can use any of several other features. For example, some systems can receive a stream of audio data, process text to speech in real time, and have streaming speech recognition; the machine learning model can correct recognized text over time with changing recognition of streamed audio data as additional audio data is received; the model can determine confidence levels in speech recognition; the model can use non-textual cues or data portions like audio and timing (e.g., pauses between words) to help recognize speech, etc. The method may continue to block 406.

In block 406, it is determined whether cached selection options have been displayed in the present call, e.g., from block 220 of FIG. 2, to show the selection options available to the user prior to those options being spoken by the target entity. If cached selection options have not been displayed, the method may continue to block 414, described below. If cached selection options have been displayed, the method may continue to block 408.

In block 408, it is determined whether there is a mismatch between the current selection option(s) determined in block 404 and the cached selection option(s) that have been displayed, e.g., whether there are significant enough differences between these options to meet one or more thresholds. The current selection options are compared with the cached selection options and, in some implementations, the menu structure of the current and cached selection options are compared.

In various implementations, the current selection options can be compared with the cached selection options using one or more of various techniques. In some examples of a first technique, the text of the cached selection options can be compared with corresponding determined text of the current selection options. The text of these options may not exactly match in many cases due to errors in speech recognition, e.g., from poor acoustic characteristics in a call that affected the audio data or for other reasons. In some implementations, the magnitude or severity of the mismatch between the current and cached selection options can be determined, e.g., using a text compare technique. If the magnitude of the mismatch is below a threshold, then the cached and current selection options can be considered to match.

In some examples of another technique for comparing the selection options, the audio data of the call as received in block 222 of FIG. 2 can be compared to a corresponding audio data portion of the cached selection option (if available), and the differences in the audio data can be determined. In some implementations, the cached selection option can be based on particular audio data from a call to the target entity identifier made previously to the current call (e.g., in a call initiated in block 312 of FIG. 3 as described above), if user permission has been obtained; such audio data may also be available from use in training machine learning models, e.g., used for detecting selection options. For example, with user permission, the audio data (e.g., from a previous call) used to determine the cached selection option can be stored in association with the cached selection option (or an audio signature derived from the audio data can be stored), e.g., stored in local memory of the call device or retrieved from a remote device. The corresponding audio data (or corresponding audio signatures) for cached and current selection options can be compared to look for differences. If significant differences in the audio data is found (e.g., there is more than a threshold difference) in the current and cached audio data, there may be a mismatch. The comparison techniques can be selected to be robust to account for possible variations in audio quality of different calls.

In some examples of a technique for determining the accuracy of the text of the current selection option, the audio data and the text of the current selection option can both be used to determine the accuracy of the text by aligning the audio and the text. For example, a machine learning model can be trained based on inputs of audio data and/or recognized text from selection options in previous calls, to output an indication of the likelihood that the text has been accurately recognized from the audio data in the current call. This likelihood that the text is correct is determined based on the audio data of the current call, e.g., based on the audio data for the words corresponding to the text and for the surrounding words that form the context for the words. Such a model can be used to provide the accuracy of the text of the current selection options determined in block 404. In some implementations, the audio data and/or text of the corresponding cached selection option can also be provided as inputs to the model to provide further reference or comparison for the model to increase accuracy of model output (e.g., the model may have been trained based on such supplemental inputs). In some implementations, this technique can be used in block 402 as a speech recognition technique for the current selection option.

The menu structures of the cached and current selection options can also be compared, if sufficient current selection options (and user selections) have been received to determine at least a portion of the call menu structure from the current call. For example, the selection options that are navigated to from previous selection options can be compared between cached and current call menus.

The comparisons of block 408 can determine, in some implementations, whether the cached selection options (and/or menu structure) may be incorrect. For example, the target entity may have changed its call menu, and the cached selection options may have been obtained at a previous time before the selection options presented by the target entity were changed. The selection options determined in block 404 may be generally more up to date since the call options are being detected in a current call.

If the current selection options match (e.g., based on one or more thresholds) as the displayed cached selection options (and call menu structures match), the method may continue to block 418, described below. In this case, the displayed visual options are not changed or updated, since there is no significant inconsistency with the current selection options. If there is a mismatch in the current and cached selection options, e.g., if any of the current selection options are different than the displayed cached selection options based on one or more thresholds (or if the call menu structures are different), the method continues to block 410.

In block 410, the cached selection option(s) that are different than the current selection option(s) are corrected based on the current selection option(s). For example, the cache or other storage that stores the differing cached selection option(s) can be updated by selectively replacing the differing cached selection option(s) (that are considered incorrect) with corresponding current selection option(s) that are considered correct. In some examples, a cached selection option of "to receive information about your order, say or press 3" may be detected as "to receive information about your order, say or press 4" for the corresponding current selection option, where each word is matched except for the number; thus, the former instance of "3" is changed to "4" in the storage that stores this selection option to correct the option. In some implementations, entire selection options or larger portions of the cache can be discarded and replaced with corresponding current selection option(s). In some implementations, if a mismatch similarly exists in call menu structures, the mismatched previous structure elements can be replaced by the elements determined in method 400.

In some implementations, the correction to the outdated selection options (and/or call menu structure) can also or alternatively be sent to other devices that may store these selection options to update the selection options stored by the other devices. For example, a server (or other remote device) may store current selection options as obtained in block 208, and this server can be sent the correct updated selection options (and/or call menu structure) that have been determined in block 404. In some implementations, the server may also determine whether other call devices have sent such corrections to the server to determine the accuracy of the correction. For example, if a threshold number of call devices have sent the correction to a particular selection option, the server can assume the correction is accurate, and can apply the correction to its corresponding stored selection option.

In some implementations, the cached selection options (and/or call menu structure) may not be corrected based on the differences in current selection options, e.g., if one or more particular conditions apply. For example, in some implementations, if the current selection options (and/or their structure in the call menu) were recognized by speech recognition techniques with a confidence level below a particular threshold, then the current selection options may not have been recognized correctly, and the cached selection options are not adjusted. In some implementations, the cached selection options can be adjusted if the cached selection options have a creation date older than a threshold period of time before the current time, thus indicating they are more likely to be stale or out of date. The method may continue to block 412.

In block 412, visual option(s) displayed by the call device are updated based on the current selection option(s) determined in block 404 from the current call. For example, a visual option that corresponds to a selection option found to be incorrect or outdated in block 410 can be replaced by a visual option that corresponds to a corresponding (e.g., current) selection option that replaced the incorrect option. In some examples, text of the incorrect visual option is changed to text of the correct visual option. In some implementations, a notification is also displayed in the user interface of the call device that indicates that a correction has been performed, and/or may indicate specifically which corrections have been performed. In some implementations, a correction is not performed under particular conditions, e.g., when a confidence level of speech recognition for the text of the selection option is below a threshold. In some implementations, a notification can be displayed indicating that there may be inconsistencies between a displayed visual option and the speech in the call (e.g., indicating that information of the visual option may not be what was spoken by the target entity in the call). In some implementations, a correction is not performed and incorrect (and/or all) visual options can be removed from the screen in response to determining that one or more of the corresponding selection options is incorrect. The method may continue to block 418, described below.

In block 414, after it is determined in block 406 that no cached selection options were available and displayed for the current call, the current selection options determined in block 404 can be cached in local memory of the call device. In some implementations, such cached selection options may later be retrieved for display in the current call, e.g., if a menu level is revisited by the user in the current call, and/or can be retrieved and displayed in a later call. In some cases, one or more of the current selection options may have already been cached, e.g., in a previous iteration of method 400 in the current call or a previous call. The method may continue to block 416.

In block 416, visual options are determined and displayed for the current call based on the current selection options determined in block 404. In some implementations, a selection option is displayed after the speech describing that selection option has completed, and each additional selection option can be displayed after the corresponding speech finishes describing it (e.g., in later iterations of method 400 during the current call). In some implementations, if this is the first iteration of block 416 for the current call, the visual options may be the first visual options displayed in the user interface for the current call. In later iterations, the visual options displayed in block 416 can add to existing visual options displayed in previous iteration(s). The method may continue to block 418.

In block 418, an indicator of current spoken text is displayed and/or updated in the user interface to point to a portion of a visual option that is currently being spoken by the target entity in the call. In some implementations, the display indicator visually indicates which word, phrase, or entire selection option is currently being spoken in the call. This feature can be used indicate to the user which of the previously displayed visual options is currently being presented by speech in the call. In various examples, the indicator can take on various forms, such as bold text for a visual option (or portion thereof) that is currently being spoken; changing the font, color, size, or other visual characteristic of such text relative to other text of the visual option and other visual options being displayed; adding a pointer to the interface that is visually associated with words currently being spoken in the call; etc. For example, a pointer can be an icon, arrow, or other object that appears above the word that is currently being spoken in the call.

In some implementations, if the confidence of recognition of text determined from the audio data (as in block 402) is below a threshold, a notification can be output by the call device when displaying visual options in block 412 or 416. In some implementations, text recognized from call audio data (e.g. in block 402) may be determined to be in a language different than the user's standard language used on the call device, and this text can be automatically translated such that call menu selection options are displayed in the user's language.

In various implementations, one or more of the blocks can be omitted from method 400, e.g., if particular features of those blocks are not provided in particular implementations. For example, in some implementations in which cached selection options are not used, the blocks 406-412 can be omitted. In another example, blocks in FIG. 3 that are not used to obtain entity data in particular implementations can be omitted.

The methods, blocks, and operations described herein can be performed in a different order than shown or described in FIGS. 2-4, and/or performed simultaneously (partially or completely) with other blocks or operations, where appropriate. For example, block 220 of FIG. 2 can be performed at least partially simultaneously with blocks 222 and/or 224. In another example, blocks 414 and 416 of FIG. 4 can be performed in a different order and/or at least partially simultaneously. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

One or more methods disclosed herein can operate in several environments and platforms, e.g., as a stand-alone computer program that can run on any type of computing device, as a mobile application ("app") run on a mobile computing device, etc.

One or more methods described herein (e.g., 200, 300, and/or 400) can be run in a standalone program that can be executed on any type of computing device, a program run on a web browser, a mobile application ("app") run on a mobile computing device (e.g., cell phone, smart phone, tablet computer, wearable device such as wristwatch, armband, jewelry, headwear, virtual reality goggles or glasses, augmented reality goggles or glasses, head mounted display, etc., laptop computer, etc.). In one example, a client/server architecture can be used, e.g., a mobile computing device (as a client device) sends user input data to a server device and receives from the server the final output data for output (e.g., for display). In another example, all computations of a method can be performed within the mobile app (and/or other apps) on the mobile computing device. In another example, computations can be split between the mobile computing device and one or more server devices.

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

FIG. 5 is a diagrammatic illustration of an example user interface 500 displayed by a display screen of a call device in which a call can be initiated, according to some implementations. For example, interface 500 can be displayed on a touchscreen by a client device, e.g., one of client devices 120-126 as shown in FIG. 1, or a display device of a different device such as a server device, e.g., server system 102.

In some implementations, user interface 500 can be associated with a call application program that initiates calls to other devices, answers incoming calls from other devices, and communicates with other devices via a call connection. In this example, a name 502 of a target entity is displayed, where the target entity has been selected, e.g., directly by a user from a web page, contact list, or other information display, as a result from a search or navigation for entities, or as a result from another user application or application process performed on the call device or other device. A call interface 504 is also displayed, which includes a numeric keypad 508, an identifier entry field 510, and a call control 512. The keys of numeric keypad 508 can be selected by a user (e.g., via a touchscreen or other input device) to enter an identifier 514 in entry field 510, e.g., one character at a time, or multiple characters in other implementations. Entity identifier 514 is associated with the entity indicated by entity name 502. A call can be initiated to the entity by using entity identifier 514. For example, entity identifier 514 is shown as a phone number, but other types of identifiers can also be input to enable a call to the entity associated with the identifier (e.g., email address or other address). In some implementations, identifier 514 can be entered automatically in entry field 510 by the call device, e.g., in response to the user selecting to call the target entity from a different application (e.g., a map application, a web browser, etc.), which causes interface 500 to be displayed by the call device. Call control 512, if selected by the user, can cause the call device to dial the identifier 514 of the target entity indicated by name 502 and initiate a call to the target entity.

FIG. 6 is a diagrammatic illustration of a call interface 600 in which selection options for a call menu in a call are displayed, according to some implementations. Call interface 600 can be displayed by the call device (e.g., a client device such as one of client devices 120-126, or a display device of a different device such as a server system 102). For example, call interface 600 can be displayed after initiating a call to the target entity 502 via entity identifier 514 shown in FIG. 5. In some examples, the call can be initiated in response to the user selecting call control 512 of interface 500 of FIG. 5 is selected by a user. A call can alternatively be initiated in various other ways, e.g., by an application in response to user selection of the target entity or entity identifier, in response to another event, automatically based on a scheduled command from the user, etc.

A name 602 of the target entity can be displayed to indicate the callee of the current call. A time duration can also be displayed to indicate the time elapsed since the call was initiated.

In some implementations, if permission and/or a command from the user has been obtained, a transcription of all speech uttered by user and target entity during the call can be transcribed by the call device and displayed in user interface 600. For example, the transcription of the speech can be displayed in display area 604 of user interface 600. Interface 600 can also include various user controls that, when selected by the user, cause control of functions related to the call or the interface 600. For example, a disconnect control 606 causes the call device to disconnect from the call, a keypad control 608 causes a numerical keypad (or keyboard) to be displayed in or over interface 600 (e.g., similar to keypad 508), a speaker control 610 causes audio output of the call device to be output as a speakerphone, and mute control 612 causes the user's speech and other sounds at the call device to not be transmitted to the callee in the call.

In the example of FIG. 6, the call to the target entity is answered by an automated voice (IVR) system (as the target entity) in which an automated voice speaks and provides selection options in a call menu for the user (caller). Text 614 is transcribed from the speech detected and recognized during the call by the call device of the user. A first portion 616 of transcribed text 614 corresponds to speech of the automated system providing introductory information which is detected to not be a selection option of a call menu, nor a part of such a selection option. In other implementations, text that is detected to not be included in a selection option, such as first portion 614, is not displayed by the call device unless the user has set a device preference or setting to do so.

A second portion 618 of text 614 corresponds to speech that was detected in the call to be in a different language than a default language or the language of first portion 616. The second portion 618 corresponds to a selection option in a call menu presented by the target entity ("for Spanish press number 9"). In FIG. 6, second portion 618 has not yet been detected as a selection option.

FIG. 7 is a diagrammatic illustration of call interface 600 in which a selection option for a call menu in a call is detected and displayed, according to some implementations. In the example of FIG. 7, the second portion 618 of transcribed text 614 (shown in FIG. 6) has been detected as a selection option in a call menu, e.g., using speech recognition techniques. For example, after the detection of the words that designate it as a selection option, the second portion 618 of text is converted (e.g., by the call device or a connected remote device) to a selection option that has an associated visual option 702 displayed in interface 600. Furthermore, the text portion 614 is removed from the screen, being replaced by visual option 702. In some implementations, some of the text in second portion 618 can be removed when converting the text to a visual option, as shown for visual option 702, such that the visual option may be presented more cleanly.

In some implementations, as shown, a border, outline, or other visual separator can be displayed around the text of visual option 702 to indicate that visual option 702 is a delineated option that can be selected similarly to a button. In this example, the number designated in the spoken selection option ("nueve") is converted into a selection designator 704 displayed in (or associated with) visual option 702, which indicates the number that can be selected on a keypad (e.g., via keypad control 608) (or in some implementations, spoken in the call) to select the visual option 702. In this example, if the visual option 702 is selected by the user, the language that the automated system speaks in the current call is changed to the indicated language (Spanish, in this example). The selection of visual option 702 also causes the text displayed in interface 600, such as transcribed text and selection options, to be changed to the selected language.

Visual option 702 is selectable by the user, e.g., via user input such as a touch of visual option 702 by the user on a touchscreen, manipulation of an input device, voice command, etc. For example, if visual option 702 is selected by touch input via a touchscreen, the selection of this option is sent by the call device to the target entity. In some examples, the selection is sent by the call device outputting a signal (e.g., a tone) in the call that provides the equivalent of the signal output when the designated number key is pressed by a user, such as a "9" key on a keypad in the example of FIG. 7. This causes the target entity to receive a signal indicating that the user has selected the number "9" and the corresponding selection option that is associated with visual option 702.

In the example of FIG. 7, visual option 702 is not selected, and the automated system of the target entity continues to speak, describing a further selection option in its call menu. The speech is detected and transcribed as text portion 706, which in this example is displayed as raw text under visual option 702 in display area 604 prior to be detected as a selection option.

FIG. 8 is a diagrammatic illustration of call interface 600 in which additional selection options of a call menu in a call have been detected and displayed, according to some implementations. In the example of FIG. 8, text portion 706 (shown in FIG. 7) has been detected as a selection option. A visual option 802 that corresponds to this selection option is displayed in display area 604 after the visual option 702. The text portion 706 is removed from the screen, being replaced by visual option 802.

Visual option 802 is selectable by the user. In this case, the selection option 802 indicates to say a designator that is a word ("travel") to select the option, rather than press a key on a keypad as for visual option 702. If the user speaks the word to the target entity, the callee detects the word and the selection of the associated selection option. In some implementations, a speech-selected selection option can be designated in interface 600 visually to distinguish it from selection options that are selected by press of a keypad key. In this example, an icon 804 is displayed in visual option 802 (or otherwise visually associated with visual option 802) to indicate that a speech-selected designator can select this selection option. In some call menus, a selection option can be selected either by speech or by key press of the user. In some implementations, a visual option for such a selection option can be displayed with a selection designator showing a key identifier and showing an indication of selectability by speech.

In the example of FIG. 8, after additional speech from the target entity, additional selection options have been detected. These selection options are displayed as visual options consecutively displayed in the display area 604. Each visual option can be determined and displayed similarly to the visual options 702 and 802 described above. In some implementations, as the text of each selection option is detected and recognized from the speech in the call, it is provided as a visual option, similarly as shown in FIGS. 6 and 7. In some implementations, the speech in the call can be displayed as raw text until all of the call menu selection options at the current menu level have been spoken in the call, at which time the text is converted into visual options that are displayed in place of the text.

In some implementations, if the user selects any of the visual options prior to all of the selection options being detected and displayed at the current menu level, the remaining selection options of the current menu level are not displayed as visual options (e.g., when receiving the selection, the target entity may discontinue speaking further selection options at the current menu level and start speaking selection options at the next menu level).

In FIG. 8, the user has not selected any of the selection options that are displayed in interface 600 and additional selection options have been detected and displayed as associated visual options similarly as for visual options 702 and 802. For example, visual options 806 and 808 are detected as selectable by a key press, such that selection designators 810 and 812, respectively, are displayed with numerals corresponding to the keypad keys for selecting these options. Visual option 814 is detected to be selectable by a key press of a "star" key of a keypad, such that selection designator 816 is displayed with a star symbol.

FIG. 9 is a diagrammatic illustration of call interface 600 in which a visual option of the call menu has been selected by the user, according to some implementations. In the example of FIG. 9, the user has tapped on a touchscreen of the call device at the location of visual option 808 to select that visual option. In this example, in response to the selection, the call device displays a selected icon 902 in place of selection designator 812 (shown in FIG. 8) to indicate that visual option 808 has been selected, and the other visual options 702, 802, 806, and 814 of the call menu are displayed with less visibility (e.g., brightness and/or color changed to be closer to the background brightness/color) to emphasize the selected visual option 808. Various implementations can provide other ways to highlight a selected visual option relative to the other visual options of a displayed call menu.

In response to the selection of visual option 808, the call device sends a signal in the call to the target entity indicating the number selected ("2"). The target entity receives the selected number and responds accordingly, as described below.

FIG. 10 is a diagrammatic illustration of call interface 600 in which a visual option of the call menu has been selected, according to some implementations. In the example of FIG. 10, after receiving the selection corresponding to visual option 808 as shown in FIG. 9, the target entity changes the call menu to a different level that is based on the selected option (which may be a second, third, or later level of the call menu, etc.). In this example, the next menu level of this navigation path of the call menu includes multiple selection options that are spoken by the target entity in the call, detected by the call device, and converted into displayed visual options 1002, 1004, and 1006. Additional visual options may also be displayed if there are further selection options at the current level of the call menu. One of these visual options can be selected by the user similarly as described above for previous visual options. In some implementations, as shown, the display screen can scroll downward to display further visual options that are detected in the call menu.

FIG. 11 is a diagrammatic illustration of a call interface 1100 displayed by a call device, in which visual options of a call menu are displayed prior to corresponding selection options being spoken in a call, according to some implementations. Call interface 1100 can be similar to call interface 600 shown in FIG. 6. In some implementations, call interface 1100 can be displayed after the call device initiates a call to the target entity, such as the target entity 502 of FIG. 5, via an entity identifier. In some implementations, call interface 1100 (or a similar interface, such as user interface 500 of FIG. 5) can be displayed before initiating the call to the target entity. For example, selection options can be displayed for the target entity which indicate, prior to the call, which options will be available to the user in the call after it is initiated via the entity identifier of the target entity.

In this example, a call is initiated, e.g., in response to the user selecting call control 512 of interface 500 of FIG. 5 or in one of other ways. A name 1102 of the target entity can be displayed with which the target entity of the current call is associated, and a time duration can be displayed to indicate the time elapsed since the call was initiated. In some implementations, if permission and/or a command from the user has been obtained, a transcription of all speech uttered by caller and callee during the call can be transcribed by the call device and displayed in a display area 1104 in user interface 1100, similarly as for call interface 600 of FIG. 6. Disconnect control 1106, keypad control 1108, speaker control 1110, and mute control 1112 can be similar to corresponding controls described above.

In the example of FIG. 11, call menu 1120 is displayed immediately after or during the initiation of the call (or may be displayed prior to initiating the call as described above). Call menu 1120, in this example, includes five visual options 1122, 1124, 1126, 1128, and 1130 which are similar to selection options described above for FIGS. 6-10. The selection options for these visual options are accessible to the call device prior to the target entity speaking, based on selection option data received prior to the call, as described herein. Displaying the visual options of the call menu 1120 prior to the target entity speaking the corresponding selection options allows the user to view the call menu in advance, and in some call menu implementations allows the user to select a selection option that causes the target entity to advance the call menu to another level without having to speak the remaining options of the menu.

In some implementations, as shown in FIG. 11, other portions of a target entity's spoken content in a call to the target entity can be retrieved prior to the call similarly to selection options of a call menu as described herein, and can be displayed prior to the target entity speaking that text during the call. In the example of FIG. 11, text 1132 is displayed prior to the target entity speaking that text and is displayed above the call menu selection options in the display area 1104. For example, text 1132 can include introductory information similarly to the example of FIG. 6, which is detected or previously known to not be part of a selection option of a call menu based on the selection option information obtained prior to the call.

During the call, the target entity utters speech information, which is detected and recognized by the call device and/or other connected devices. In general, the speech information should match the displayed text and visual options (the speech information may not exactly match displayed visual options due to converting some speech information into a visual option format, such as selection designator icons or numbers). As described above with respect to FIG. 4, if the spoken information does not match the text of a visual option, the visual option can be corrected and the corrected version displayed in place of the original version. In some implementations or cases in which correction is not performed, a notification can be displayed that indicates errors may be present in visual options, and/or one or more of the visual options can be removed from the display screen.

In some implementations as shown, an indicator can be displayed to indicate a portion of displayed text (including text in selection options) that is currently being spoken by the target entity in the call. In this example, the indicator highlights currently spoken text 1134 in a bold font. Following text 1134 and selection options 1122-1130 have not yet been spoken in the call and are displayed in regular (e.g., non-boldface) font and/or are displayed with reduced visibility (e.g., higher or lower brightness, depending on the background brightness and/or color). In this example, text that was previously spoken in the call remains highlighted in bold as the spoken portion of the call menu continues to highlight new text, such that the new, leading bolded text indicates the currently spoken text in the call. In some implementations, as shown in FIG. 12, previously spoken text that is not part of a selection option can be shown with reduced emphasis relative to text of selection options. In some implementations, currently spoken text can be highlighted in other ways, e.g., displayed in a different color than the other displayed text, displaying a separate pointer, arrow, or other visual indicator above or near the currently spoken text, etc.

The displayed indication of currently callee-spoken text allows a user to see at a glance the progress of the spoken call menu, which, e.g., may allow the user to see if the target entity is currently waiting on the user to select a provided option. In some implementations of call menus, the target entity may not respond to a selection of a selection option until a particular amount of progress has been made in speaking the call menu. For example, a selection option may have to be fully spoken or partly spoken by a particular amount before it is selectable. In some of these implementations, providing an indicator of the current spoken text in the call may allow the user to estimate when a visual option is eligible to be selected, thus potentially reducing wasted attempts at selections of options by the user to which the target entity does not respond.

FIG. 12 is a diagrammatic illustration of call interface 1100 of FIG. 11 in which the indicator of currently spoken text is advanced to visual options of a call menu, according to some implementations. In this example, the target entity has spoken the remaining portion of introductory text 1132 as well as the selection option represented by visual option 1122. Thus, all of text 1132 and visual option 1122 are displayed in highlighted form, e.g., bold text and/or greater visibility. In addition, an initial portion 1202 of visual option 1124 is currently being spoken by the callee, such that portion 1202 is displayed in highlighted form compared to other portions of visual option 1124 (in some implementations, one or more portions of the visual option can also be highlighted when at least a portion of the visual option is being spoken, such as a selection designator as shown, and/or a border of the option). The visual options 1126, 1128, and 1130 have not yet been spoken by the target entity and are displayed with reduced visibility.

FIG. 13 is a diagrammatic illustration of call interface 1100 of FIG. 11 in which the indicator of currently spoken text is advanced further in the call menu, according to some implementations. In this example, the target entity has spoken introductory text 1132 and the selection options represented by visual options 1122, 1124, and 1126. Thus, text 1132 and these visual options are displayed in highlighted form with greater visibility than prior to being spoken. In addition, an initial portion 1302 of visual option 1128 is currently being spoken by the callee, such that portion 1302 is displayed in highlighted form compared to other portions of visual option 1128. The visual option 1130 has not yet been spoken by the target entity and is displayed with reduced visibility.

FIG. 14 is a diagrammatic illustration of call interface 1100 of FIG. 11 in which the indicator of currently spoken text is advanced to a next level in the call menu, according to some implementations. In this example, the target entity has spoken introductory text 1132 and all of the selection options of an initial level of the call menu. Thus, text 1132 and these visual options are displayed in highlighted form (only visual options 1126, 1128, and 1130 are currently visible in FIG. 14 due to scrolling of the display screen). In addition, the user has selected visual option 1128, as indicated by selection designator 1402.

After the selection of visual option 1128, the next level of the call menu is displayed by the call device. As with the previous level displayed in FIG. 11, the visual options of the next level are known in advance due to the call device having accessed data indicating these options as described herein, and the next level visual options are displayed prior to being spoken in the call. The next level visual options are displayed as visual options 1404, 1406, 1408, and 1410. In the example of FIG. 14, an initial portion 1412 of visual option 1404 is currently being spoken by the callee, such that portion 1412 is displayed in highlighted form compared to other portions of visual option 1404 (in some implementations, as shown, one or more portions of the visual option can also be highlighted, such as the selection designator of an associated key number). The visual options 1406-1410 have not yet been spoken by the target entity and are displayed with reduced visibility.

In the examples of FIGS. 6-14, the user and/or call device initiated the call and are the caller, and the target entity is the callee (entity callee) in the example calls. In other examples, the target entity may call the user and/or call device such that the target entity is the caller and the user and/or call device are the callee.

Figure 15:
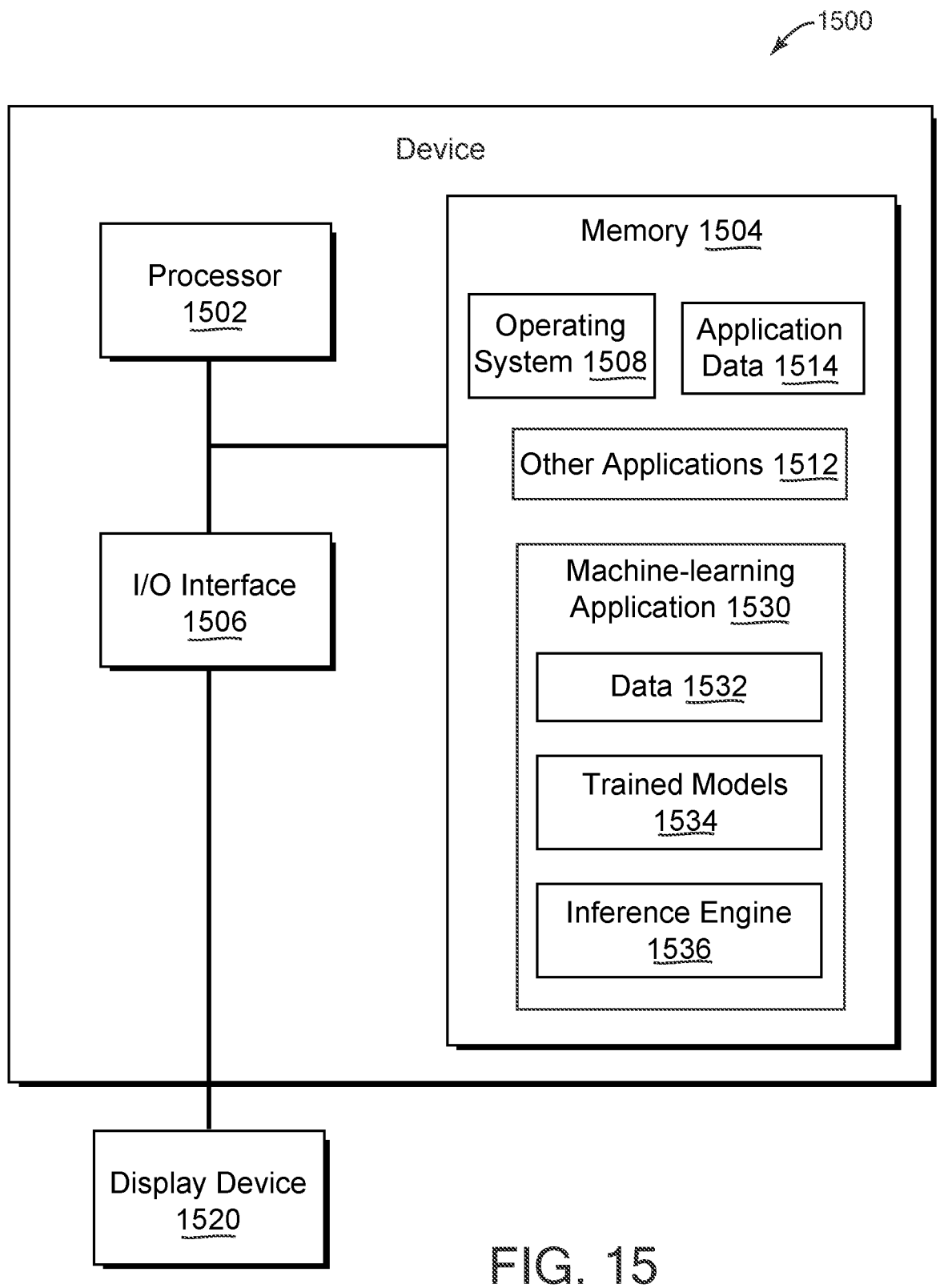
FIG. 15 is a block diagram of an example device which may be used for one or more implementations described herein.

FIG. 15 is a block diagram of an example device 1500 which may be used to implement one or more features described herein. In one example, device 1500 may be used to implement a client device, e.g., any of client devices 120-126 shown in FIG. 1. Alternatively, device 1500 can implement a server device, e.g., server device 104, etc. In some implementations, device 1500 may be used to implement a client device, a server device, or a combination of the above. Device 1500 can be any suitable computer system, server, or other electronic or hardware device as described herein.

In some implementations, device 1500 includes a processor 1502, a memory 1504, and I/O interface 1506. Processor 1502 can be one or more processors and/or processing circuits to execute program code and control basic operations of the device 1500. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 1502 may include one or more co-processors that implement neural-network processing. In some implementations, processor 1502 may be a processor that processes data to produce probabilistic output, e.g., the output produced by processor 1502 may be imprecise or may be accurate within a range from an expected output. For example, a processor may perform its functions in "real-time," "offline," in a "batch mode," etc. Portions of processing may be performed at different times and at different locations, by different (or the same) processing systems. A computer may be any processor in communication with a memory.

Memory 1504 is typically provided in device 1500 for access by the processor 1502, and may be any suitable processor-readable storage medium, such as random access memory (RAM), read-only memory (ROM), Electrically Erasable Read-only Memory (EEPROM), Flash memory, etc., suitable for storing instructions for execution by the processor, and located separate from processor 1502 and/or integrated therewith. Memory 1504 can store software operating on the server device 1500 by the processor 1502, including an operating system 1508, machine-learning application 1530, other applications 1512, and application data 1514. Other applications 1512 may include applications such as a data display engine, a communication application (e.g., dialer or call application, an over-the-top calling application, other application with calling capability such as an application associated with a particular entity such as a bank, a restaurant, or other organization/provider that provides apps), web hosting engine, image display engine, notification engine, social networking engine, etc. In some implementations, the machine-learning application 1530 and/or other applications 1512 can each include instructions that enable processor 1502 to perform functions described herein, e.g., some or all of the methods of FIGS. 2, 3, and/or 4. Application data 1514 can include call menu data such as selection option data and other entity data, audio data from calls (with user permission), audio data from call menus, text transcripts of call menus, timestamps of call selection options and call menu structure that indicate recency, call characteristics including call times, call durations, and other characteristics of previous calls (with user permission), and/or data structures (e.g., tables, lists, graphs) that can be used to determine call selection options as described herein.

The machine-learning application 1530 can include one or more named-entity recognition (NER) implementations for which supervised and/or unsupervised learning can be used. The machine learning models can include multi-task learning based models, residual task bidirectional LSTM (long short-term memory) with conditional random fields, statistical NER, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 1530 may utilize Bayesian classifiers, support vector machines, neural networks, or other learning techniques. In some implementations, machine-learning application 1530 may include trained models 1534, an inference engine 1536, and data 1532. In some implementations, data 1532 may include training data, e.g., data used to generate trained models 1534. For example, training data may include any type of data suitable for training a model for determining selection options for calls, such as speech data indicating speech uttered during previous calls, call menu data indicating selection options provided in calls by entities, call characteristics of previous calls by users (if user consent has been obtained), etc. Training data may be obtained from any source, e.g., a data repository specifically marked for training, data for which permission is provided for use as training data for machine-learning, etc. In implementations where one or more users permit use of their respective user data to train a machine-learning model, e.g., trained models 1534, training data may include such user data. In implementations where users permit use of their respective user data, data 1532 may include permitted data.

In some implementations, training data may include synthetic data generated for the purpose of training, such as data that is not based on user input or activity in the context that is being trained, e.g., data generated from simulations or models, etc. In some implementations, machine-learning application 1530 excludes data 1532. For example, in these implementations, the trained models 1534 may be generated, e.g., on a different device, and be provided as part of machine-learning application 1530. In various implementations, the trained models 1534 may be provided as a data file that includes a model structure or form, and associated weights. Inference engine 1536 may read the data file for trained model 1534 and implement a neural network with node connectivity, layers, and weights based on the model structure or form specified in trained models 1534.

Machine-learning application 1530 also includes one or more trained models 1534. For example, such models can include trained models for recognizing speech and determining selection options from speech received as audio data in calls as described herein. In some implementations, the trained models 1534 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 1532 or application data 1514. Such data can include, for example, speech data from calls, entity data indicating selection options for calls, call characteristics of previous calls, and/or feedback from users regarding previous calls and provided selection options. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of selection options to be provided in an interface. In some implementations, different layers or models can be used to recognize speech, e.g., receive input of audio data and provide an output that is text representing speech in the input audio data. In some implementations, model form or structure also specifies a number and/or type of nodes in each layer.

In different implementations, one or more trained models 1534 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, one or more trained models 1534 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 1532, to produce a result.

For example, training may include applying supervised learning techniques. In supervised learning, the training data can include a plurality of inputs (e.g., audio data and/or entity data) and a corresponding expected output for each input (e.g., a set of selection options for a call menu; and/or text representing speech in audio data). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to determine or cluster call characteristics that are similar to each other.

In another example, a model trained using unsupervised learning may cluster features of speech or selection options based on the use of the speech and selection options in data sources. In some implementations, unsupervised learning may be used to produce knowledge representations, e.g., that may be used by machine-learning application 1530. In various implementations, a trained model includes a set of weights, or embeddings, corresponding to the model structure. In implementations where data 1532 is omitted, machine-learning application 1530 may include trained models 1534 that are based on prior training, e.g., by a developer of the machine-learning application 1530, by a third-party, etc. In some implementations, one or more of trained models 1534 may each include a set of weights that are fixed, e.g., downloaded from a server that provides the weights.

Machine-learning application 1530 also includes an inference engine 1536. Inference engine 1536 is configured to apply the trained models 1534 to data, such as application data 1514, to provide inferences such as a set of selection options in a call menu and a structure of a call menu. In some implementations, inference engine 1536 may include software code to be executed by processor 1502. In some implementations, inference engine 1536 may specify circuit configuration (e.g., for a programmable processor, for a field programmable gate array (FPGA), etc.) enabling processor 1502 to apply the trained model. In some implementations, inference engine 1536 may include software instructions, hardware instructions, or a combination. In some implementations, inference engine 1536 may offer an application programming interface (API) that can be used by operating system 1508 and/or other applications 1512 to invoke inference engine 1536, e.g., to apply trained models 1534 to application data 1514 to generate an inference.

Machine-learning application 1530 may provide several technical advantages. For example, when trained models 1534 are generated based on unsupervised learning, trained models 1534 can be applied by inference engine 1536 to produce knowledge representations (e.g., numeric representations) from input data, e.g., application data 1514. For example, a model trained for determining selection options and/or menu structure may produce representations thereof. In some implementations, such representations may be helpful to reduce processing cost (e.g., computational cost, memory usage, etc.) to generate an output (e.g., a label, a classification, an estimated characteristic, etc.). In some implementations, such representations may be provided as input to a different machine-learning application that produces output from the output of inference engine 1536.

In some implementations, knowledge representations generated by machine-learning application 1530 may be provided to a different device that conducts further processing, e.g., over a network. In such implementations, providing the knowledge representations rather than data may provide a technical benefit, e.g., enable faster data transmission with reduced cost.

In some implementations, machine-learning application 1530 may be implemented in an offline manner. In these implementations, trained models 1534 may be generated in a first stage, and provided as part of machine-learning application 1530. In some implementations, machine-learning application 1530 may be implemented in an online manner. For example, in such implementations, an application that invokes machine-learning application 1530 (e.g., operating system 1508, one or more of other applications 1512) may utilize an inference produced by machine-learning application 1530, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained models 1534, e.g., to update embeddings for trained models 1534.

In some implementations, machine-learning application 1530 may be implemented in a manner that can adapt to particular configuration of device 1500 on which the machine-learning application 1530 is executed. For example, machine-learning application 1530 may determine a computational graph that utilizes available computational resources, e.g., processor 1502. For example, if machine-learning application 1530 is implemented as a distributed application on multiple devices, machine-learning application 1530 may determine computations to be carried out on individual devices in a manner that optimizes computation. In another example, machine-learning application 1530 may determine that processor 1502 includes a GPU with a particular number of GPU cores (e.g., 1000) and implement the inference engine accordingly (e.g., as 1000 individual processes or threads).

In some implementations, machine-learning application 1530 may implement an ensemble of trained models. For example, trained models 1534 may include a plurality of trained models that are each applicable to same input data. In these implementations, machine-learning application 1530 may choose a particular trained model, e.g., based on available computational resources, success rate with prior inferences, etc. In some implementations, machine-learning application 1530 may execute inference engine 1536 such that a plurality of trained models is applied. In these implementations, machine-learning application 1530 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 1508 or one or more other applications 1512.

In different implementations, machine-learning application 1530 can produce different types of outputs. In some implementations, machine-learning application 1530 may produce an output based on a format specified by an invoking application, e.g., operating system 1508 or one or more other applications 1512. In some implementations, an invoking application may be another machine-learning application. For example, such configurations may be used in generative adversarial networks, where an invoking machine-learning application is trained using output from machine-learning application 1530 and vice-versa.

Any of software in memory 1504 can alternatively be stored on any other suitable storage location or computer-readable medium. In addition, memory 1504 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 1504 and any other type of storage (magnetic disk, optical disk, magnetic tape, or other tangible media) can be considered "storage" or "storage devices."

I/O interface 1506 can provide functions to enable interfacing the server device 1500 with other systems and devices. Interfaced devices can be included as part of the device 1500 or can be separate and communicate with the device 1500. For example, network communication devices, storage devices (e.g., memory 1504 and/or database 106), and input/output devices can communicate via I/O interface 1506. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 1506 can include one or more display devices 1520 and one or more data stores 1538 (as discussed above). The display devices 1520 that can be used to display content, e.g., a user interface of an output application as described herein. Display device 1520 can be connected to device 1500 via local connections (e.g., display bus) and/or via networked connections and can be any suitable display device. Display device 1520 can include any suitable display device such as an LCD, LED, or plasma display screen, CRT, television, monitor, touchscreen, 3-D display screen, or other visual display device. For example, display device 1520 can be a flat display screen provided on a mobile device, multiple display screens provided in a goggles or headset device, a projector, or a monitor screen for a computer device.

The I/O interface 1506 can interface to other input and output devices. Some examples include display devices, printer devices, scanner devices, etc. Some implementations can provide a microphone for capturing sound, voice commands, etc., audio speaker devices for outputting sound, or other input and output devices.

For ease of illustration, FIG. 15 shows one block for each of processor 1502, memory 1504, I/O interface 1506, and software blocks 1508, 1512, and 1530. These blocks may represent one or more processors or processing circuitries, operating systems, memories, I/O interfaces, applications, and/or software modules. In other implementations, device 1500 may not have all of the components shown and/or may have other elements including other types of elements instead of, or in addition to, those shown herein. While some components are described as performing blocks and operations as described in some implementations herein, any suitable component or combination of components of environment 100, device 1500, similar systems, or any suitable processor or processors associated with such a system, may perform the blocks and operations described.

Although the description has been described with respect to particular implementations, these particular implementations are merely illustrative, and not restrictive. Concepts illustrated in the examples may be applied to other examples and implementations.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's or user device's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:

during a call between a call device and a device associated with a target entity:

obtaining selection option data including one or more selection options for a user of the call device to navigate through a call menu provided by the target entity in the call;

causing one or more visual options corresponding to the one or more selection options to be displayed by the call device before the call device receives audio data that includes speech indicating the one or more selection options, wherein the one or more visual options are each selectable via user input to cause corresponding navigation through the call menu, and wherein each of the one or more visual options include respective text;

receiving audio data in the call, the audio data including the speech indicating the one or more selection options;

while receiving the audio data, programmatically analyzing a portion of the audio data that is currently being received to determine current text representing the speech in the portion of the audio data that is currently being received;

determining, based on the current text, a particular portion of the respective text of a corresponding one of the one or more visual options displayed during the call; and causing a visual indicator to be displayed during the call, wherein the visual indicator highlights the particular portion of the respective text of the corresponding one of the one or more visual options displayed during the call.

2. The computer-implemented method of claim 1, further comprising, in response to receiving a selection of a particular visual option of the one or more visual options, causing an indication of the selection to be sent to the device associated with the target entity, wherein the indication is a signal corresponding to a press of a key of a keypad, the key associated with the particular visual option.

3. The computer-implemented method of claim 1, wherein the one or more visual options are each selectable via touch input on a touchscreen of the call device.

4. The computer-implemented method of claim 1, wherein the audio data is first audio data, the method further comprising:

in response to receiving a selection of a particular visual option of the one or more visual options:

receiving second audio data in the call, the second audio data including second speech indicating one or more second selection options for the user of the call device;

programmatically analyzing the second audio data to determine second text representing the second speech in the second audio data;

determining the one or more second selection options based on programmatically analyzing at least one of the second text or the second audio data; and causing at least a portion of the second text to be displayed by the call device, wherein the at least a portion of the second text is displayed as one or more second visual options corresponding to the one or more second selection options, wherein the one or more second visual options are each selectable via second user input to cause corresponding navigation through the call menu.

5. The computer-implemented method of claim 1, wherein the one or more selection options are a plurality of selection options, the method further comprising programmatically analyzing at least one of the text or the audio data to determine a hierarchical structure of the plurality of selection options in the call menu.

6. The computer-implemented method of claim 1, wherein the one or more selection options in the selection option data are determined by programmatically analyzing audio data received during previous calls.

7. The computer-implemented method of claim 6, wherein the obtained selection option data is cached in the call device prior to initiation of the call, wherein the obtained selection option data is associated with entity identifiers that have been previously called by callers in a geographic area of the call device, wherein the entity identifiers have been previously called at least a threshold number of times or have been previously called a higher number of times than other entity identifiers that are not associated with the obtained selection option data.

8. The computer-implemented method of claim 1, further comprising:

comparing the selection option data with the one or more selection options determined from the audio data; and determining whether a mismatch exists between the selection option data and the one or more selection options determined from the audio data.

9. The computer-implemented method of claim 8, further comprising, in response to determining a mismatch between the selection option data and the one or more selection options determined from the audio data, causing a notification of the mismatch to be output by the call device.

10. The computer-implemented method of claim 8, further comprising, in response to determining a mismatch between the selection option data and the one or more selection options determined from the audio data, modifying the selection option data to match the one or more selection options determined from the audio data.

11. The computer-implemented method of claim 8, wherein comparing the selection option data with the one or more selection options includes one of:

comparing text of the selection option data with the text of the one or more selection options; or comparing audio data of the selection option data with the audio data received during the call.

12. The computer-implemented method of claim 1, further comprising:

causing the one or more selection options to be stored in at least one of: storage of the call device or storage of a remote device that communicates with the call device over a communication network; and retrieving the one or more selection options for a next call between the call device and the target entity.

13. The method of claim 1, further comprising, in response to receiving a selection of a particular visual option of the one or more visual options, causing speech provided by the call device in the call to be sent to the device associated with the target entity, the speech comprising a designator associated with the particular visual option.

14. A call device comprising:

a memory with instructions stored thereon;

a display device; and at least one processor coupled to the memory, the at least one processor configured to access the instructions from the memory to perform operations comprising:

during a call between the call device and a device associated with a target entity:

obtaining selection option data including one or more selection options for a user of the call device to navigate through a call menu provided by the target entity in the call;

causing one or more visual options corresponding to the one or more selection options to be displayed by the call device before the call device receives audio data that includes speech indicating the one or more selection options, wherein the one or more visual options are each selectable via user input to cause corresponding navigation through the call menu, and wherein each of the one or more visual options include respective text;

receiving audio data in the call, the audio data including the speech indicating the one or more selection options;

while receiving the audio data, programmatically analyzing a portion of the audio data that is currently being received to determine current text representing the speech in the portion of the audio data that is currently being received;

determining, based on the current text, a particular portion of the respective text of a corresponding one of the one or more visual options displayed during the call; and causing a visual indicator to be displayed during the call, wherein the visual indicator highlights the particular portion of the respective text of the corresponding one of the one or more visual options displayed during the call.

15. The call device of claim 14, wherein the at least one processor performs further operations comprising, in response to receiving a selection of a particular visual option of the one or more visual options, causing an indication of the selection to be sent to the device associated with the target entity, wherein the indication is one of:

a signal corresponding to a press of a key of a keypad, the key associated with the particular visual option, or speech provided by the call device in the call, the speech comprising a designator associated with the particular visual option.

16. The call device of claim 14, wherein the at least one processor performs further operations comprising:

comparing the selection option data with the one or more selection options determined from the audio data; and determining whether a mismatch exists between the selection option data and the one or more selection options determined from the audio data.

17. The call device of claim 14, wherein the one or more selection options in the selection option data are determined by programmatically analyzing audio data received during previous calls.

18. The call device of claim 14, wherein the obtained selection option data is cached in the call device prior to initiation of the call, wherein the obtained selection option data is associated with entity identifiers that have been previously called by callers in a geographic area of the call device, wherein the entity identifiers have been previously called at least a threshold number of times or have been previously called a higher number of times than other entity identifiers that are not associated with the obtained selection option data.

19. A non-transitory computer readable medium having stored thereon instructions that, when executed by a processor, cause the processor to perform operations comprising:

during a call between a call device and a device associated with a target entity:

obtaining selection option data including one or more selection options for a user of the call device to navigate through a call menu provided by the target entity in the call;

causing one or more visual options corresponding to the one or more selection options to be displayed by the call device before the call device receives audio data that includes speech indicating the one or more selection options, wherein the one or more visual options are each selectable via user input to cause corresponding navigation through the call menu, and wherein each of the one or more visual options include respective text;

receiving audio data in the call, the audio data including the speech indicating the one or more selection options;

while receiving the audio data, programmatically analyzing a portion of the audio data that is currently being received to determine current text representing the speech in the portion of the audio data that is currently being received;

determining, based on the current text, a particular portion of the respective text of a corresponding one of the one or more visual options displayed during the call; and causing a visual indicator to be displayed during the call, wherein the visual indicator highlights the particular portion of the respective text of the corresponding one of the one or more visual options displayed during the call.

* * * * *